United States Patent
Maharyta et al.

(10) Patent No.: US 11,556,184 B1
(45) Date of Patent: Jan. 17, 2023

(54) HIGH-DISTANCE DIRECTIONAL PROXIMITY SENSOR

(71) Applicant: Cypress Semiconductor Corporation, San Jose, CA (US)

(72) Inventors: Andriy Maharyta, Lviv (UA); Vasyl Mandziy, Lviv (UA); Oleksandr Karpin, Lviv (UA); Oleksandr Hoshtanar, Lviv (UA)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

(21) Appl. No.: 17/703,888

(22) Filed: Mar. 24, 2022

Related U.S. Application Data

(60) Provisional application No. 63/255,391, filed on Oct. 13, 2021.

(51) Int. Cl.
  *G06F 3/01* (2006.01)
  *G06F 3/041* (2006.01)
  *G06F 3/044* (2006.01)

(52) U.S. Cl.
  CPC ............ *G06F 3/017* (2013.01); *G06F 3/0443* (2019.05); *G06F 3/0448* (2019.05); *G06F 3/04166* (2019.05); *G06F 2203/04101* (2013.01); *G06F 2203/04107* (2013.01)

(58) Field of Classification Search
  CPC .... G06F 3/017; G06F 3/04166; G06F 3/0443; G06F 3/0448; G06F 2203/04101; G06F 2203/04107
  See application file for complete search history.

(56) References Cited

U.S. PATENT DOCUMENTS

| | | | |
|---|---|---|---|
| 9,285,934 B2 * | 3/2016 | Shepelev | G06F 3/0446 |
| 9,594,458 B2 * | 3/2017 | Shepelev | G06F 3/04166 |
| 9,618,981 B2 * | 4/2017 | Dunphy | G06F 3/0443 |
| 9,671,915 B2 * | 6/2017 | Shepelev | G06F 3/04164 |
| 11,366,549 B2 * | 6/2022 | Feng | H03K 17/962 |
| 2014/0226083 A1* | 8/2014 | Dunphy | G06F 1/1692 349/12 |
| 2014/0267145 A1* | 9/2014 | Shepelev | G06F 3/0446 345/174 |
| 2016/0179290 A1* | 6/2016 | Shepelev | G06F 3/04166 345/174 |
| 2017/0003778 A1* | 1/2017 | Shepelev | G06F 3/0443 345/174 |
| 2021/0397293 A1* | 12/2021 | Feng | G06F 3/0418 |

* cited by examiner

*Primary Examiner* — Michael Pervan

(57) ABSTRACT

Apparatuses and methods of high-distance directional proximity sensors are described. One apparatus includes at least three electrodes in a sensor layer, an electrode in a shield layer, and an insulator located between the layers. A processing device is configured to scan the at least three electrodes over a period of time to obtain a digital signal for each of the at least three electrodes while driving a shield signal on the electrode of the shield layer. The processing device detects a gesture by an object using the digital signals. The processing device measures an amplitude value of the digital signal for each of the at least three electrodes and outputs an indication of the gesture responsive to a ratio of a highest amplitude value and a lowest amplitude value satisfying a first threshold criterion that represents the object being within a proximity detection area above the sensor layer.

20 Claims, 15 Drawing Sheets

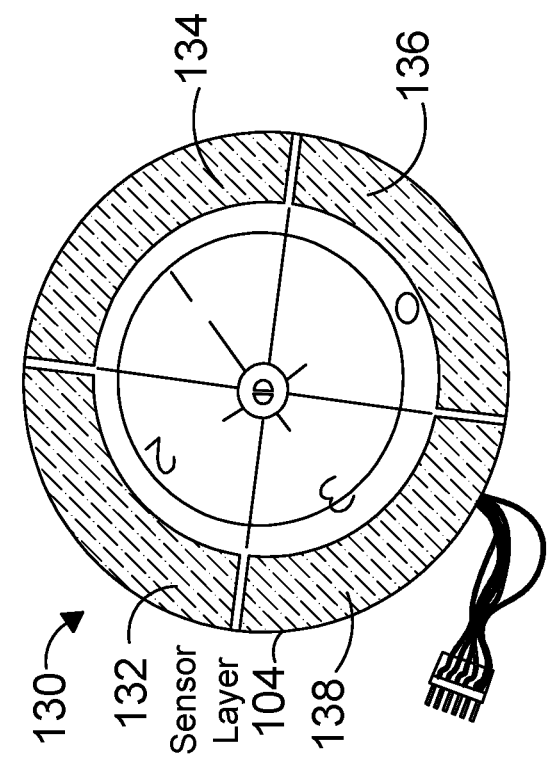
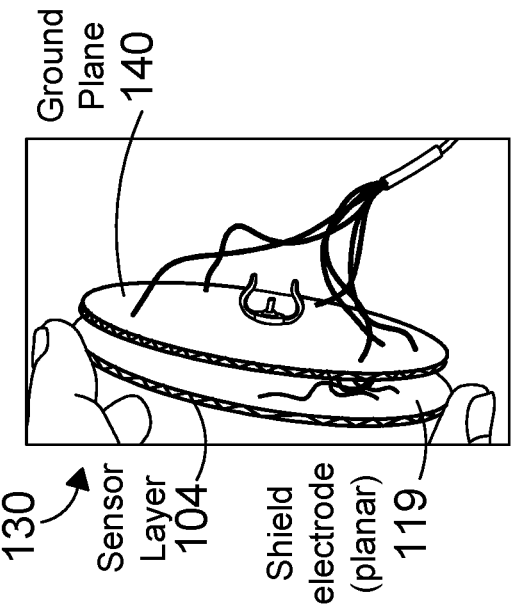
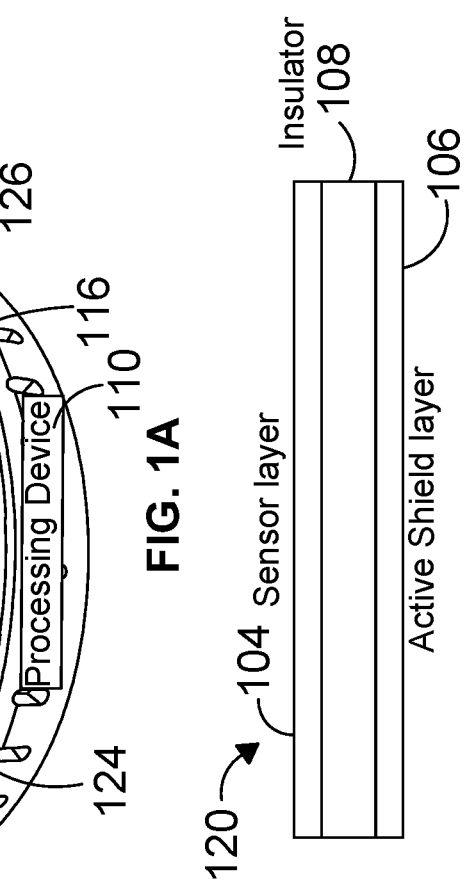

HIGH-DISTANCE DIRECTIONAL PROXIMITY SENSOR

This application claims the benefit of U.S. Provisional Application No. 63/255,391, filed on Oct. 13, 2021, which is incorporated by reference herein in its entirety.

TECHNICAL FIELD

The present disclosure generally relates to sensing systems, particularly proximity-sensing systems configurable to detect gestures directionally and at a high distance.

BACKGROUND

Proximity-sensing systems can be used to detect a presence and/or a gesture of an object in proximity. These proximity-sensing systems can use capacitive sensing, ultrasound sensing, infrared (IR) proximity sensing, radar sensing, and sound sensing (e.g., microphones). Capacitive proximity sensing can enhance a user interface for various consumer devices (e.g., smart speakers, laptops, tablets, mobile phones, toys, appliances, and the like) by providing an intuitive way for a user to interact with the consumer device. Proximity sensors can be used in these applications to detect gestures without any physical contact between the user and the consumer device.

Capacitance sensing systems can sense electrical signals generated on electrodes that reflect changes in capacitance. Such changes in capacitance can indicate a touch event (i.e., the proximity of an object to particular electrodes). Capacitive sense elements may be used to replace mechanical buttons, knobs, and other similar mechanical user interface controls. The use of a capacitive sense element eliminates complicated mechanical switches and buttons, providing reliable operation under harsh conditions. In addition, capacitive sense elements are widely used in modern customer applications, providing new user interface options in existing products. Capacitive sense elements can range from a single button to a large number arranged in the form of a capacitive sense array for a touch-sensing surface.

Arrays of capacitive sense elements work by measuring the capacitance of a capacitive sense element's capacitance and looking for a delta (change) in capacitance indicating a touch or presence of a conductive object. When a conductive object (e.g., a finger, a hand, or other objects) comes into contact with or close proximity to a capacitive sense element, the capacitance changes, and the conductive object is detected. An electrical circuit can measure the capacitance changes of the capacitive touch sense elements, and the electrical circuit converts the measured capacitances of the capacitive sense elements into digital values.

There are two typical types of capacitance: 1) mutual capacitance where the capacitance-sensing circuit is coupled to both electrodes and a drive/receive configuration to measure the capacitance between the electrodes; 2) self-capacitance, where the capacitance-sensing circuit is coupled to a single electrode of the capacitor where the second electrode is tied to a direct current (DC) voltage level or is parasitically coupled to Earth Ground. A touch panel has a distributed load of the capacitance of both types 1) and 2), and some touch solutions sense both capacitances either uniquely or in hybrid form with its various sense modes.

BRIEF DESCRIPTION OF THE DRAWINGS

FIG. 1A illustrates an electronic device with a directional proximity sensor according to at least one embodiment.

FIG. 1B is a block diagram of a stackup of layers of a directional proximity sensor according to at least one embodiment.

FIG. 1C illustrates a perspective view of a directional proximity sensor according to at least one embodiment.

FIG. 1D illustrates a top view of a directional proximity sensor according to at least one embodiment.

DETAILED DESCRIPTION

Figure 2A:
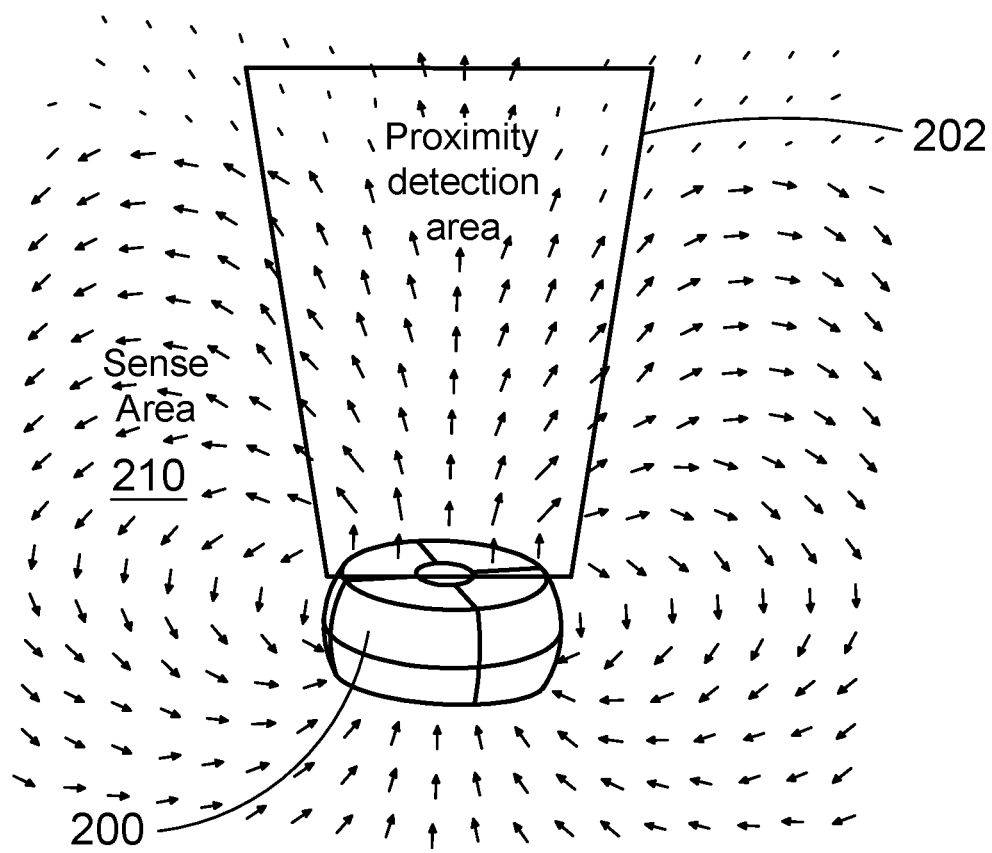
FIG. 2A illustrates a proximity detection area of a directional proximity sensor according to at least one embodiment.

As described above, capacitive proximity sensing can enhance a user interface for various consumer devices (e.g., smart speakers, laptops, tablets, mobile phones, toys, appliances, and the like) by providing an intuitive way for a user to interact with the consumer device. Proximity sensors can be used in these applications to detect gestures without any physical contact between the user and the consumer device. There are some challenges with capacitive proximity sensors. The main challenges include achieving a large proximity-sensing distance and distinguishing the proximity of an object around (e.g., not directly above) the sensor from the proximity of an object above the sensor in a specific detection zone or with directivity. It is also challenging to provide a robust solution if a grounded or floating metal object is set or removed near the proximity sensor or if different noise sources surround the proximity sensor.

One conventional proximity sensor detects a proximity gesture by comparing the difference count between two proximity sensors with respect to time. For example, when a left-to-right swipe (also referred to as a flick gesture or a motion gesture) is performed in the X-axis, the signal from the two proximity sensors varies in a way that the first proximity sensor triggers first, followed by the second proximity sensor being triggered. This trigger pattern can be determined to interpret the gesture. This method can also be applied to the two proximity sensors in the Y-axis. The conventional proximity sensors have a small gesture detection distance, such as a less than a few centimeters. The conventional proximity sensors cannot distinguish the proximity of an object around the sensors from an object above the sensors and do not work if a grounded/floating metal object is set near or removed from the vicinity of the proximity sensor.

Aspects of the present disclosure of embodiments overcome the deficiencies described above and others by providing a directional proximity solution that reports gestures only for objects detected in a specific area (also referred to herein as a detection zone or a proximity detection area) above a sensor layer. Aspects of the present disclosure of embodiments can increase the proximity detection distance for robustly detecting gestures for up to 15 centimeters. The proximity detection distance can be a distance that is greater than a diameter of a proximity sensor. Aspects of the present disclosure of embodiments can provide a robust system that works if a grounded/floating metal object is set near or removed from the vicinity of the proximity sensor. Aspects of the present disclosure of embodiments can robustly work in environments with different noise sources surrounding the proximity sensor. In at least one embodiment, the proximity sensor is a directional capacitive proximity sensor based on self-capacitance sensing, proximity signal processing, and proximity gesture detection. In at least one embodiment, the directional capacitive proximity sensor includes a number of electrodes in a sensor layer and an active shield electrode in a shield layer with an insulator between the sensor and shield layers. For example, the directional capacitive proximity sensor can include four electrodes in the sensor layer, one electrode per side of the sensor layer. These four electrodes can be curved to form a circle of four sensor electrodes on a circular surface of a device. The active shield electrode can be a planar electrode located opposite the circular surface with the four sensor electrodes.

Aspects of the present disclosure of embodiments can enhance a touch user interface for a variety of devices (e.g., smart speakers, laptops, tablets, mobile phones, toys, appliances, and the like) by providing an intuitive way for the user to interact with the device while increasing a proximity detection distance, providing directionality to the proximity sensing within a specific area, and providing proximity detection in the presence of metal objects or other noise sources near the device. Aspects of the present disclosure of embodiments can provide an alternate way to allow touch activation in high traffic areas where classic switch control mechanisms have become contamination points for dirt build-up and germs. Aspects of the present disclosure of embodiments can allow a "wake-on-approach" feature to a device to achieve the lowest system power by using the proximity sensors as system-wake sources.

FIG. 1A illustrates an electronic device 100 with a directional proximity sensor 102 according to at least one embodiment. The electronic device 100 can be a wireless speaker device or any type of device. The directional proximity sensor 102 can use shielded, open-field capacitive sensors to detect the proximity of an object and proximity gestures. In particular, the directional proximity sensor 102 includes a sensor layer 104, a shield layer 106, an insulator 108, and a processing device 110.

The sensor layer 104 includes four electrodes 112, 114, 116, 118 disposed in a first plane on a first side of the electronic device 100. The insulator 108 can be located between the sensor layer 104 and the shield layer 106 (also referred to as an active shield layer since it is driven with a shield signal). The insulator 108 can be a textolite (also referred to as TCF) of a printed circuit board. Alternatively, other types of insulators can be used. The shield layer 106 includes a shield electrode 119 (plate or another conductor) disposed in a second plane parallel to the sensor layer 104 in the first plane. The processing device 110 is coupled with 112, 114, 116, 118, and the shield electrode 119. The processing device 110 is configured to scan the four electrodes 112, 114, 116, 118 over a period of time to obtain a digital signal for each of the four electrodes 112, 114, 116, 118 while driving a shield signal on the shield electrode 119 of the shield layer 106. The digital signals can be a sequence of digital values (also called counts) measured by the capacitance-sensing circuit. The digital values of the digital signal can represent the measured capacitance of the electrode.

The processing device 110 detects a gesture by an object using the digital signals. As part of gesture detection, the processing device 110 measures an amplitude value of the digital signal for each of the four electrodes 112, 114, 116, 118. The processing device 110 outputs an indication of the gestures responsive to a ratio of a highest amplitude value and a lowest amplitude value satisfying a first threshold criterion. The first threshold criterion represents the object being within a proximity detection area above the sensor layer 104, as described in more detail with respect to FIGS. 2A-2E.

In at least one embodiment, the processing device 110 includes a proximity sensing circuit that generates digital signals and a processing element that processes the digital signals to detect a presence of an object and a gesture of the object above the directional proximity sensor 102. In at least one embodiment, the processing device 110 can use a capacitance sensing (CapSense) sigma-delta (CSD) sensing channel. In another embodiment, the processing device 110 can use other capacitance sensing channels to measure self-capacitance of the electrodes 112, 114, 116, 118, such as standard ADC, Successive Approximation Register (SAR) ADC, or other types of charge-to-digital converters (CDCs). Alternatively, the processing device 110 can measure the mutual capacitance of an intersection between two electrodes. The electrodes 112, 114, 116, 118 can be part of a user input device. In other embodiments, the electrodes 112, 114, 116, 118 can be an organic light-emitting diode (OLED) touch sensors, Touch and Display Integration (TDDI) touch sensors, and or like. Although various embodiments are described herein with respect to capacitance sensing, the embodiments described herein can also be used with other sensor types, including, for example, impedance sensors, inductance sensors, inductive vibration sensors, ultrasound sensing, infrared (IR) proximity sensing, radar sensing, and sound sensing (e.g., microphones).

In at least one embodiment, the processing device 110 includes a touch controller coupled to the electrodes 112, 114, 116, 118, and shield electrode 119. The electrodes 112, 114, 116, and 118 form touch sensors (also called "unit cell" or sensor cells) when coupled with the touch controller. The touch controller can measure a sensor capacitance, $C_s$, of each touch sensor. The touch controller includes one or more receiver (RX) sensing channels to measure the capacitance of the touch sensors. The touch controller can include multiplexing circuitry (e.g., TX/RX multiplexer) to couple one or more touch sensors to one or more RX sensing channels.

In at least one embodiment, the touch controller uses shielded capacitive sensors. In this embodiment, the touch controller includes a shield source that generates a shield signal, $V_{SH}$. The shield source can be programmable to adjust amplitude, phase, or both. The touch controller can include a shield driver to drive the shield electrode 119 with the shield signal. The touch controller can also include an excitation source that generates an excitation signal, $V_{EX}$. The excitation signal can also be referred to as a transmit (TX) signal. The RX sensing channels can use the excitation signal, $V_{EX}$, for measuring the capacitance, e.g., self-capacitance or mutual capacitance. The RX sensing channels can receive a sense signal from a touch sensor. The RX sensing channels can include an analog-to-digital converter (ADC) that generates a digital signal. The RX sensing channels can include other types of sensing channels, like CSD, standard ADC, Successive Approximation Register (SAR) ADC, or other types of charge-to-digital converters (CDCs). The touch controller can include processing logic to further process the digital signal for proximity detection, gesture detection, or the like. As described above, the touch controller can be used with shielded or non-shielded capacitive sensors depending on the implementation.

FIG. 1B is a block diagram of a stackup 120 of layers of a directional proximity sensor according to at least one embodiment. The stackup 120 includes a sensor layer 104, a shield layer 106, and an insulator 108 located between the sensor layer 104 and the shield layer 106. The stackup 120 can be located above a ground plane 140, such as a ground plane of a circuit board upon which the processing device 110, or other electronics, are located, as illustrated in FIG. 1C.

FIG. 1C illustrates a perspective view of a directional proximity sensor 130 according to at least one embodiment. The ground plane 140 is located in a third plane, whereas the shield electrode 119 is located in a second plane, and electrodes 132, 134, 136, 138 are located in a first plane, as illustrated in FIG. 1D. The three planes are parallel to one another. The shield electrode 119 and the electrodes 132, 134, 136, 138 are separated by an insulator 108. There is a gap 142 between the ground plane 140 and the shield electrode 119 in the shield layer 106. The gap 142 can be an air gap. The gap 142 can include another insulator. In other embodiments, there is no ground plane 140.

FIG. 1D illustrates a top view of the directional proximity sensor 130 according to at least one embodiment. The first electrode 132 is located on a first side of a device, and the third electrode 136 is located on a second side opposite the first side. The second electrode 134 is located on a third side of the device, and the fourth electrode 138 is located on a fourth side opposite the third side. The electrodes 132-138 are curved four-sided shapes that curve around a perimeter of the device. Alternatively, additional electrodes can be used, such as illustrated with the electrodes 122, 124, and 126. These electrodes can be used for other functions, such as redundancy, localization of neighboring noise sources, or the like.

As described above, the four electrodes (or any number of electrodes) located on a first plane and a shield electrode located on a second plane parallel to the first plane can be used for proximity detection within a proximity detection area above the first plane, such as illustrated and described below with respect to FIGS. 2A-2E, while rejecting objects and gestures detected outside of the proximity detection area.

FIG. 2A illustrates a proximity detection area 202 of a directional proximity sensor 200 according to at least one embodiment. The directional proximity sensor 200 is similar to the directional proximity sensor 102 of FIG. 2A or the directional proximity sensor 130 of FIGS. 1C-1D. The directional proximity sensor 200 has a sensor area 210 in which objects can be detected. The proximity detection area 202 is an area above the sensor layer in which objects and gestures are detected and reported. Objects and gestures detected outside of the proximity detection area 202 are not reported.

As described above, as part of gesture detection, the processing device 110 measures an amplitude value of the digital signal for each of the four electrodes 112-118 (or 132-138). The processing device determines a highest amplitude value and a lowest amplitude value of the digital signals. The processing device determines a ratio of the highest amplitude value and the lowest amplitude value and determines whether the ratio satisfies a first threshold criterion. For example, a reject gesture method can be run if any gesture is detected from the side of the directional proximity sensor 200. The reject gesture method can reject unwanted gestures from the side of the directional proximity sensor 200. The ratio can correspond to an angle (e.g., 40-60 degrees) from the first plane. In at least one embodiment, the processing device can reject a gesture if $$\frac{2 \cdot maxSignalAmplitude}{minSignalAmplitude} \geq maxMinRatio,$$

where $maxSignalAmplitude = \max_i(\max S_i)$, and where $minSignalAmplitude = \min_i(\min S_i)$, Where $maxS_i$ is the maximum response signals from each touch sensor during some period of time (e.g., during the last 50 scans). The maxMinRatio is a tunable parameter that represents a threshold of the proximity detection area 202. The maxSignalAmplitude is the highest amplitude value, and minSignalAmplitude is a lowest amplitude value of the digital signals. Here, the maximum signal amplitude is multiplied by two. In other embodiments, the maxMinRatio can be divided be two. Also, in other embodiments, the threshold can be defined with respect to gesture acceptance or gesture allowance, instead of gesture rejection. For example, the processing device can detect and report a gesture if $$\frac{2 \cdot maxSignalAmplitude}{minSignalAmplitude} < maxMinRatio.$$

Alternatively, the specific threshold criterion could be defined in other manners. The proximity detection area 202 can provide protection against grounded metal objects or floating metal objects set or removed in the vicinity of the directional proximity sensor 200, such as on the lateral sides of the directional proximity sensor 200, as illustrated in FIG. 2C.

As described herein, conventional proximity sensors have a gesture recognition distance that is approximately the distance of the shortest electrode (e.g., a typical value is 2.5 inches). The directional proximity sensor 200 can achieve a larger proximity detection distance (also referred to as gesture recognition distance), as illustrated in FIG. 2B.

Figure 2B:
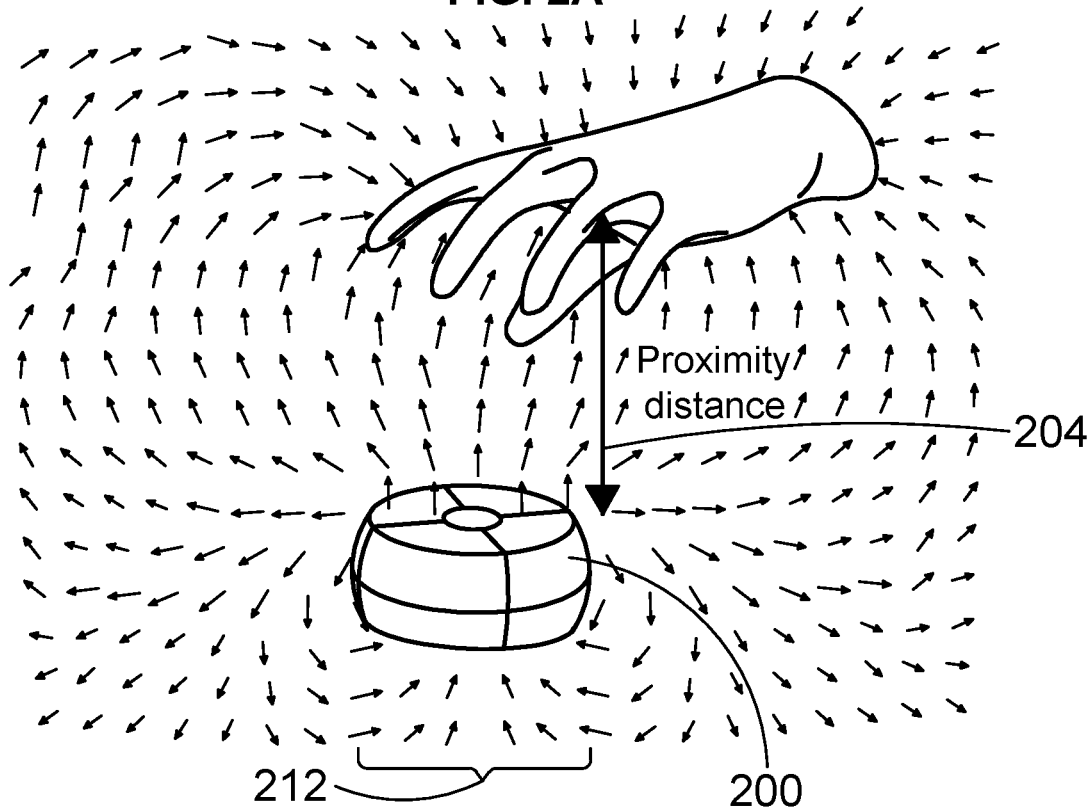
FIG. 2B illustrates a proximity detection distance of the directional proximity sensor of FIG. 2A according to at least one embodiment.
Figure 2C:
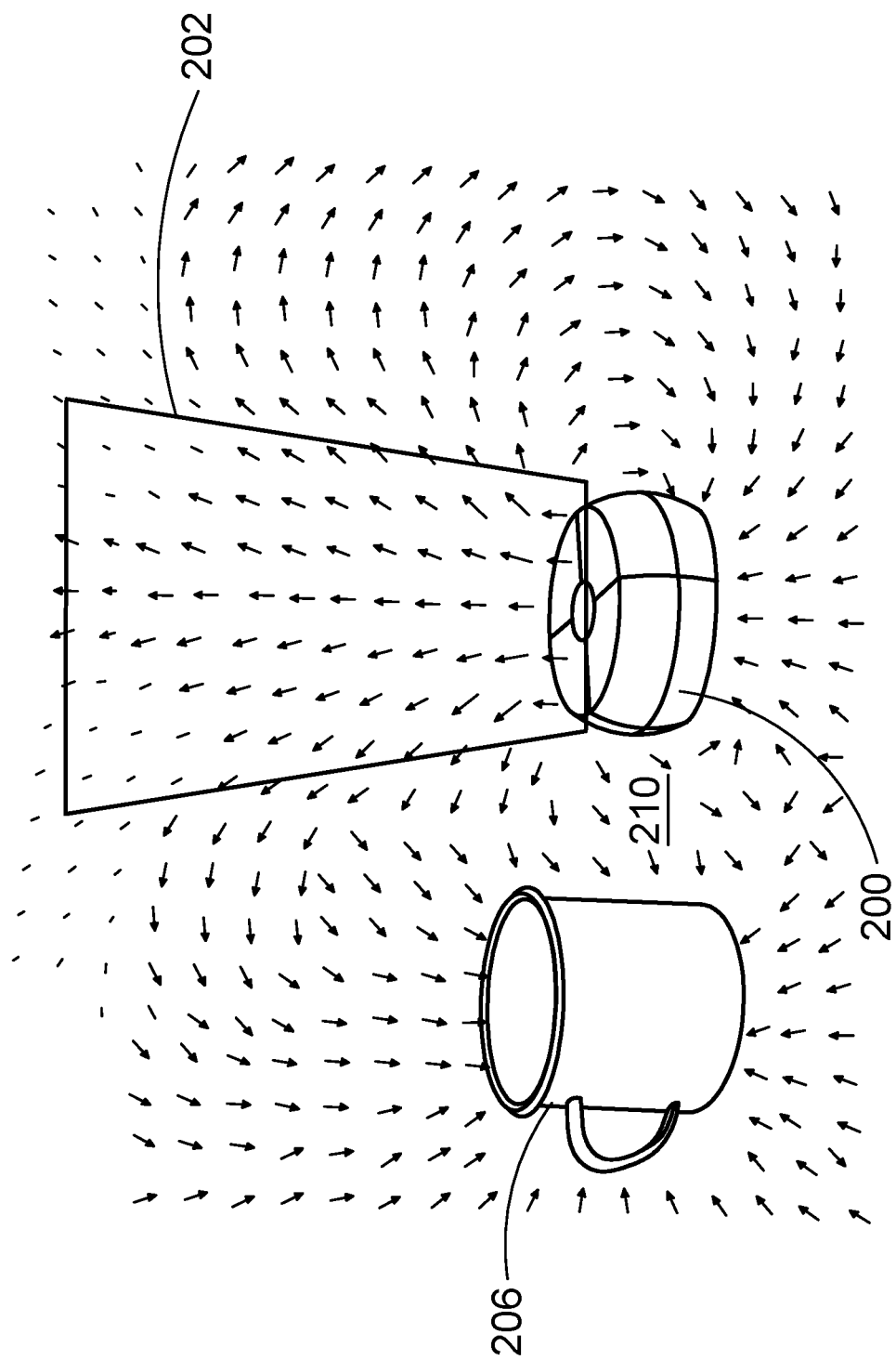
FIG. 2C illustrates a metal object near the directional proximity sensor of FIG. 2A according to at least one embodiment.

FIG. 2B illustrates a proximity detection distance 204 of the directional proximity sensor 200 of FIG. 2A according to at least one embodiment. In at least one embodiment, the directional proximity sensor 200 increases the proximity detection distance 204 by self-capacitance sensing and the shield electrode 119. The proximity detection distance 204 can be greater than a diameter 212 of the proximity detection distance 204. In some embodiments, the proximity detection distance 204 is up to 15 centimeters. In other embodiments, greater proximity detection distance can be achieved with larger electrodes. The directional proximity sensor 200 can detect gestures within the proximity detection distance 204 and the proximity detection area 202.

Proposed directional capacitive proximity solution utilizes Self-Cap sensing method:

FIG. 2C illustrates a metal object 206 near the directional proximity sensor 200 of FIG. 2A according to at least one embodiment. Since the metal object 206 is outside the proximity detection area 202, it is not detected as a gesture when being set or removed in the sense area 210. Also, various embodiments of baseline updating and resetting are described herein that can reduce the effects caused by the presence of the metal object 206.

Figure 2D:
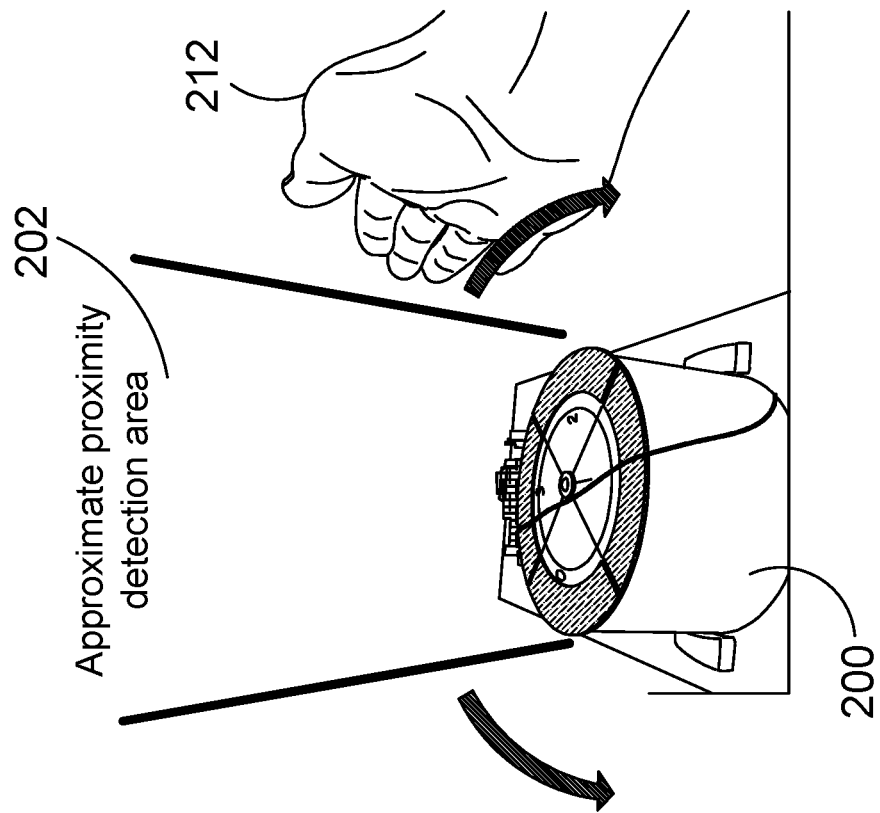
FIG. 2D illustrates a gesture by an object detected in a proximity detection area according to at least one embodiment.
Figure 2E:
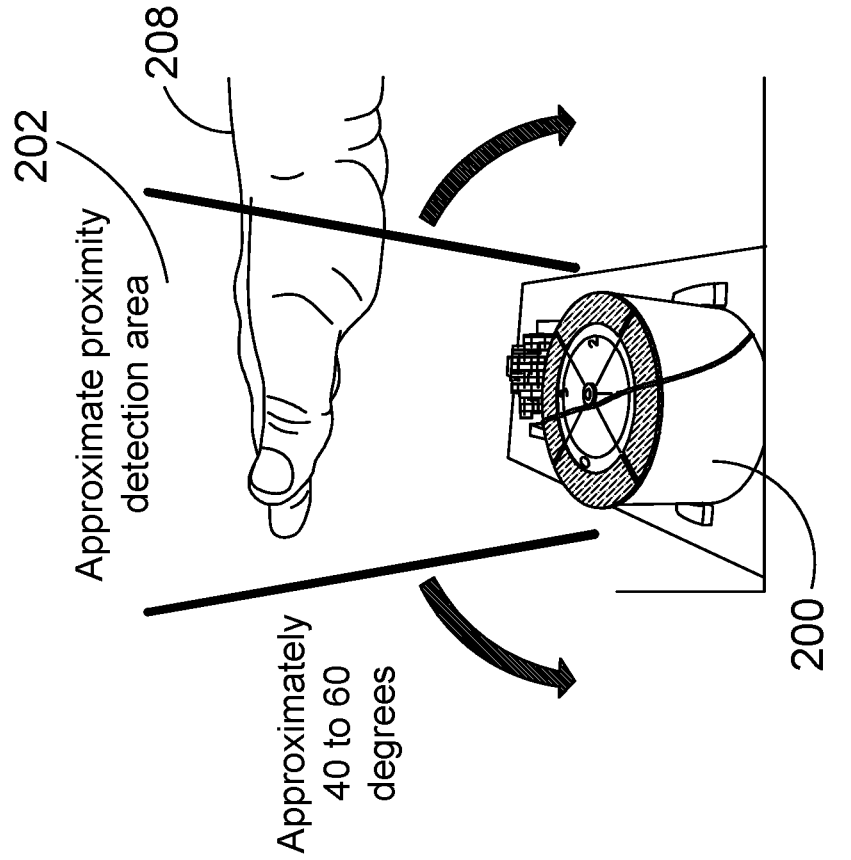
FIG. 2E illustrates a gesture by an object detected outside the proximity detection area according to at least one embodiment.

FIG. 2D illustrates a gesture by an object 208 detected in a proximity detection area 202 according to at least one embodiment. In this embodiment, the object 208 is a user's hand. The directional proximity sensor 200 can detect the gesture by the object 208 in the proximity detection area 202 and report the gesture. In this embodiment, the proximity detection area 202 is defined at approximately 40 to 60 degrees from a plane of the electrodes of the directional proximity sensor 200, such as a top side of the directional proximity sensor 200. In this embodiment, the directional proximity sensor 200 ranges from about 6 to 12 inches for the proximity detection distance.

FIG. 2D illustrates a gesture by an object 212 detected outside the proximity detection area 202 according to at least one embodiment. In this embodiment, the proximity detection area 202 is defined at approximately 40 to 60 degrees from a plane of the electrodes of the directional proximity sensor 200, such as a top side of the directional proximity sensor 200. In this embodiment, the object 212 is also the user's hand. The directional proximity sensor 200 can detect the gesture by the object 212 outside of the proximity detection area 202. Since the gesture by the object 212 is outside of the proximity detection area 202, no gesture is reported.

Figure 3:
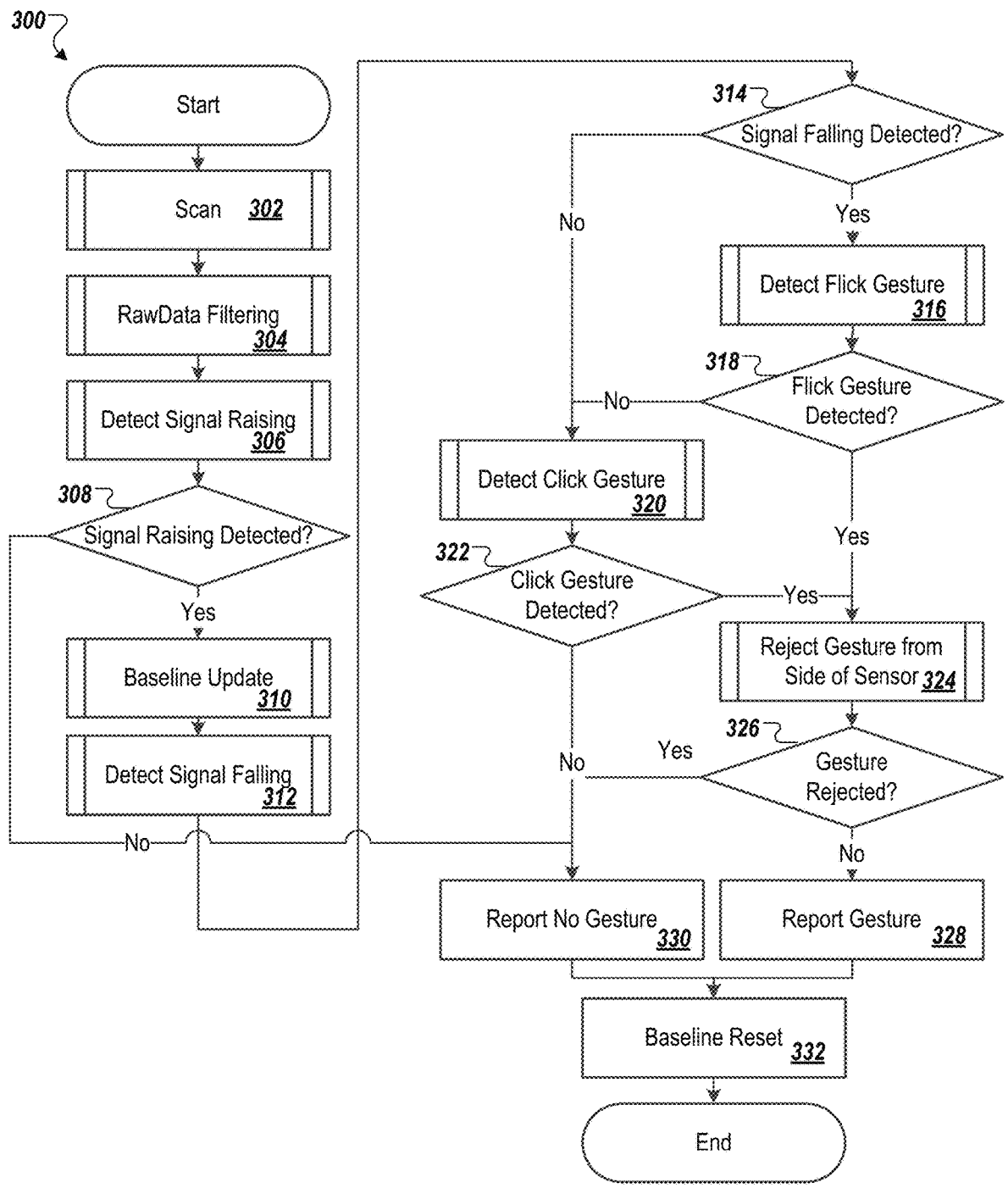
FIG. 3 is a flow diagram of a method of gesture detection according to at least one embodiment.

FIG. 3 is a flow diagram of a method 300 of gesture detection according to at least one embodiment. In some embodiments, processing logic may perform the method 300. The processing logic may include hardware, software, or any combination thereof. In one embodiment, the processing device 110 of FIG. 1. In another embodiment, the method 300 is performed by a touch controller. In another embodiment, the method 300 is performed by a proximity sensing circuit and a processing device coupled to the proximity sensing circuit. Alternatively, other components may be used to perform some or all of the operations of method 300.

Referring to FIG. 3, the processing logic begins the method 300 by scanning at least four electrodes over a period of time to obtain a digital signal for each of the at least four electrodes (block 302). Although at least three electrodes are needed for gesture detection, at least four electrodes can be used to guarantee robustness while having reasonable signal-to-noise ration. As described herein, the at least four electrodes are located in a first plane. In one embodiment, the processing logic drives an electrode with a shield signal over the period of time, the electrode being located in a second plane parallel to the first plane. The processing logic measures signals associated with the at least four electrodes and converts the measured signals to digital signals. The digital signals can be used to detect an object and gestures by the object within a proximity detection area. For example, the processing logic can measure an amplitude value of the digital signal for each of the at least four electrodes. The processing logic outputs an indication of the gesture responsive to a ratio of a highest amplitude value and a lowest amplitude value satisfying a threshold criterion that represents the object being within a proximity detection area above the first plane.

In the illustrated embodiment, to detect and determine whether to report a gesture, the processing logic filters the scan data (also called raw data). In at least one embodiment, for each digital signal of each of the at least four electrodes, the processing logic filters the digital signal using an infinite impulse response (IIR) filter to obtain a filtered signal (block 304). In at least one embodiment, the filter initialization for a first scan after the application can use the following equations:

$$RawDataFiltScaled_0 = 2^8 \cdot RawData$$

$$RawDataFilt_0 = RawData$$

Subsequent, the processing logic filters the data using the following equations:

$$RawDataFiltScaled_i = RawDataFiltScaled_{i-1} + 2^{(8-iirShift)} \cdot RawData - \frac{RawDataFiltScaled_{i-1}}{2^{iirShift}}$$

$$RawDataFilt_i = \frac{RawDataFiltScaled_i}{2^8}$$

where iirShift is a parameter that controls the filtering rate. The iirShift can be programmable.

The processing logic determines whether a signal raising condition is detected (blocks 306 and 308). The processing logic can determine that a signal raising condition is detected by determining that a first number of consecutive positive increases (also referred to as positive deltas of signals in time) in the filtered signal satisfies a second threshold criterion. For example, the first number satisfies the second threshold criterion when the first number is equal to or greater than a first threshold number (e.g., 7), as illustrated in FIG. 4A.

Figure 4A:
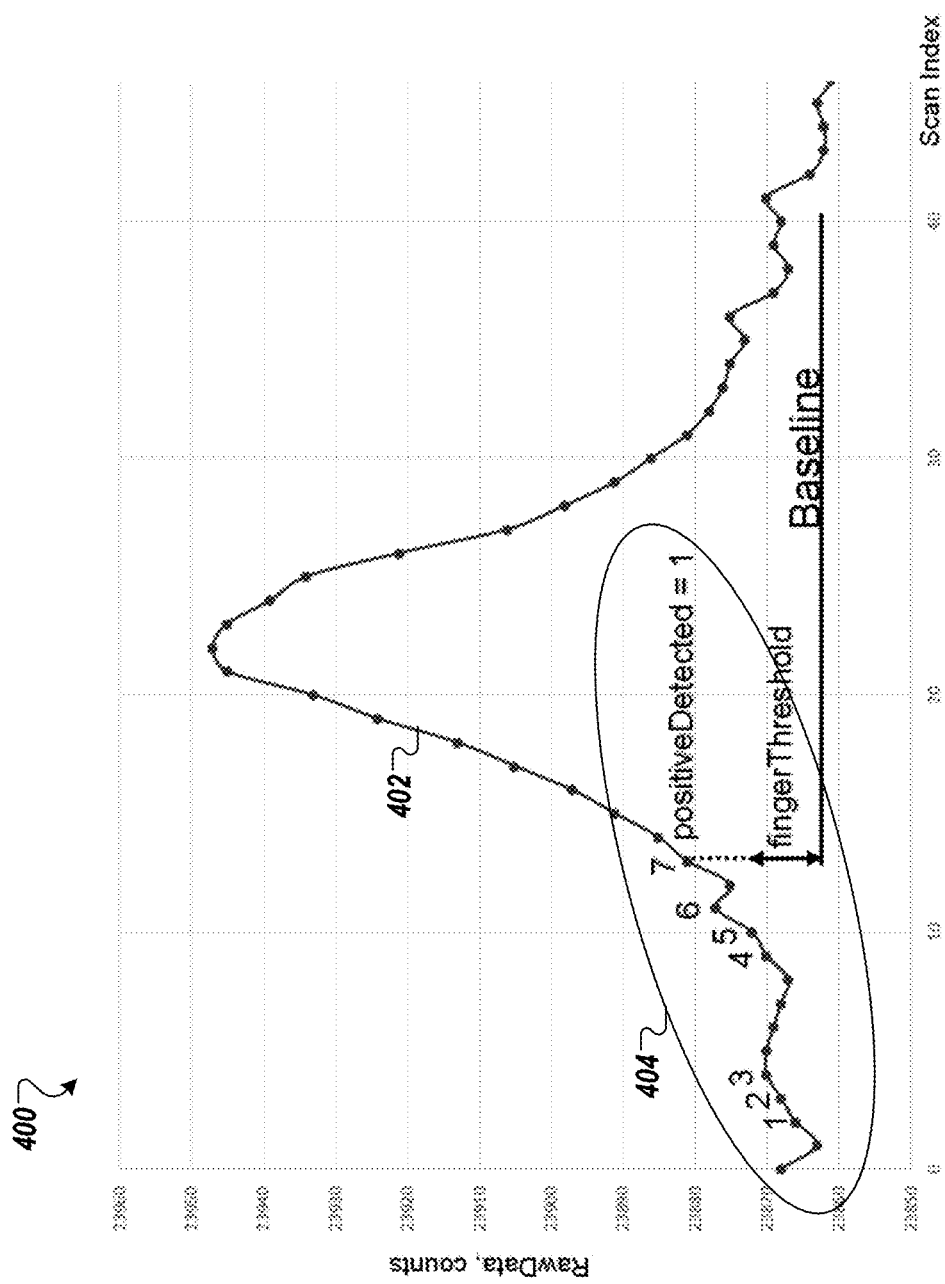
FIG. 4A is a graph of a number of scans over time for signal raising detection and updating a baseline in the method of FIG. 3 according to at least one embodiment.

FIG. 4A is a graph 400 of a number of scans over time for signal raising detection and updating a baseline in the method of FIG. 3, according to at least one embodiment. As shown in FIG. 4A, the first number of positive increases (positive deltas) (e.g., 7) detected in the filtered signal 402 satisfies the second threshold criterion (e.g., 7), so a signal raising condition 404 is detected (e.g., positiveDetected=1). If the signal raising condition 404 is detected at block 308, the processing logic performs a baseline update (block 310).

The processing logic performs the baseline update by assigning a baseline value to a minimum value of the filtered data (e.g., RawDataFilt). The filtered data starts increasing and reaches a value that is greater than some threshold (e.g., fingerthreshold). The baseline value can be updated if the positive signal raising in counts (positive deltas) exceeds this threshold amount (e.g., 10 in the illustrated embodiment). In this manner, the baseline value can be set for detecting a gesture at this instance. In at least one embodiment, the processing logic updates a baseline value to a lowest value of the digital signal responsive to the first number satisfying the second threshold criterion and the subsequent values of the digital signal satisfying a baseline threshold criterion. The processing logic can rest the baseline value responsive to the indication being output or no gesture being detected.

Referring to FIG. 3, the processing logic determines whether a signal falling condition is detected (blocks 312 and 314). The processing logic can determine that a signal falling condition is detected by determining that a second number of consecutive negative decreases (also referred to as negative deltas of signals in time) in the filtered signal satisfies a third threshold criterion. For example, the second number satisfies the third threshold criterion when the second number is equal to or greater than a second threshold number (e.g., 7), as illustrated in FIG. 4B.

Figure 4B:
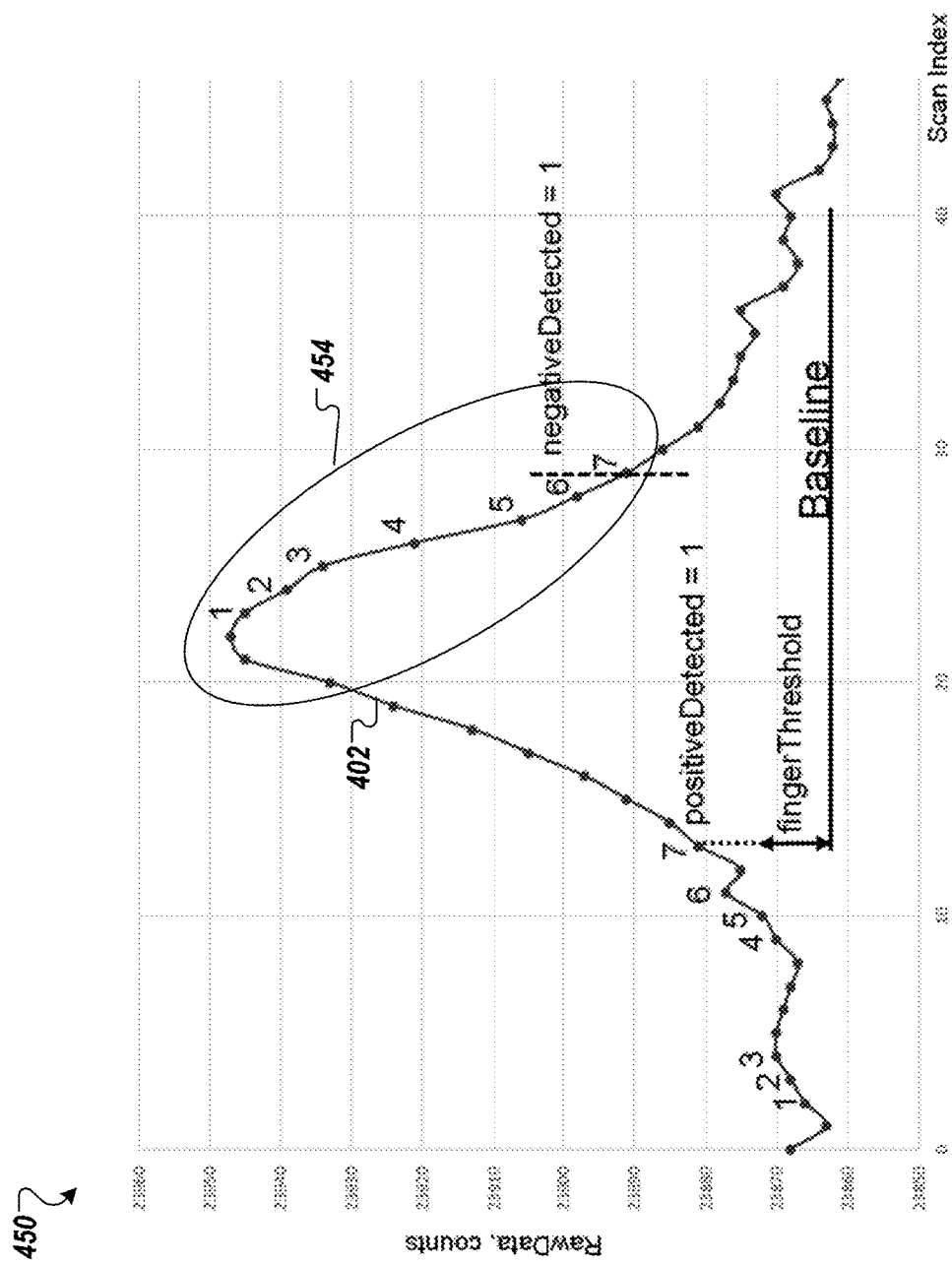
FIG. 4B is a graph of a number of scans over time for signal falling detection in the method of FIG. 3 according to at least one embodiment.

FIG. 4B is a graph 450 of a number of scans over time for signal falling detection in the method of FIG. 3 according to at least one embodiment. As shown in FIG. 4B, the second number of negative decreases (negative deltas) (e.g., 7) detected in the filtered signal 402 satisfies the third threshold criterion (e.g., 7), so a signal falling condition 454 is detected (e.g., negativeDetected=1). If the signal falling condition 454 is detected at block 314, the processing logic performs swipe gesture detection at block 316. Swipe gestures can also be referred to as flick gestures or motion gestures. If the signal falling condition 454 is not detected at block 314, the processing logic performs click gesture detection at block 320. Click gestures can also be referred to as activation gestures or selection gestures. In other embodiments, the processing logic can detect multiple types of gestures and distinguish between the different types. For example, the processing logic can detect a first type gesture or a second type gesture based on the digital signal processing.

The processing logic can determine that the gesture is a swipe gesture at blocks 316 and 318 responsive to the first number satisfying the second threshold criterion and the second number satisfying a third threshold criterion. If the second number does not satisfy the third threshold criterion at block 318, the processing logic goes to block 320. The processing logic can determine that the gesture is a click gesture at blocks 320, 322 responsive to the first number satisfying the second threshold criterion and the second number not satisfying the third threshold criterion.

In one embodiment, if the click gesture is detected at block 322 or the swipe gesture is detected at block 318, the processing logic determines whether to reject the gesture if not in the proximity detection area (blocks 324 and 326), as described above with respect to FIGS. 2A-2E. That is, if the gesture is detected on the side of the proximity sensor, the gesture detected at block 318 or 322 are rejected, and the processing logic does not report the gesture (block 330). Similarly, if the click gesture is not detected at block 322, the processing logic does not report a gesture (block 330). If the gesture is detected within the proximity detection area at block 326, the processing logic reports the gesture (block 328). In this embodiment, regardless of whether the gesture is reported at block 328 or not reported at block 330, the processing logic performs a baseline reset to reset the baseline value (block 322), and the method 300 ends.

In at least one embodiment, the baseline threshold (fingerthreshold) and the first number of positive increases, and the second number of negative decreases can be programmable parameters. In at least one embodiment, the first number and the second number can use a same programmable parameter (e.g., numberPositiveNegative). In at least one embodiment, the four proximity sensors are scanned regularly. As a result, there are four RawData values. They are filtered (IIR) to decrease the noise. RawDataFilt can change with temperature and other external noises, and will change if some object appears close to the proximity sensor. Here, baseline is an artificial signal (created based on RawDataFilt). Ideally Baseline should follow RawDataFilt until some object appears close to the proximity sensor. Baseline should eliminate temperature and other noises influence. Gestures are detected based on the Diff=RawDataFilt−Baseline (signal changes from object). Therefore, baseline is updated if no object above the sensor and is freeze if the is an object. FingerThreshold is some tunable parameter to detect object approaching to the sensor (RawDataFilt start increase rapidly).

In at least one embodiment, the processing logic at block 310 sets the baseline value to the minimum value for each of the sensors and updates the baseline value to an increased number where the signal increases to be higher than a baseline threshold (e.g., 10 in the example shown in FIG. 4A). The processing logic at block 332 resets the baseline value to the current filtered signal (RawDataFilt$_i$) or a minimum value for a subsequent set of scans. In at least one embodiment, the baseline reset operation doesn't allow the baseline value to be larger than the raw data as expressed in the following code:

```
if (RawDataFilt_i<Baseline_i)
    Baseline_i=RawDataFilt_i
end
```

The baseline update and reset method allows the directional proximity sensor to work robustly if a grounded metal object or a floating metal object is set or removed in the vicinity of the directional proximity sensor.

Figure 5:
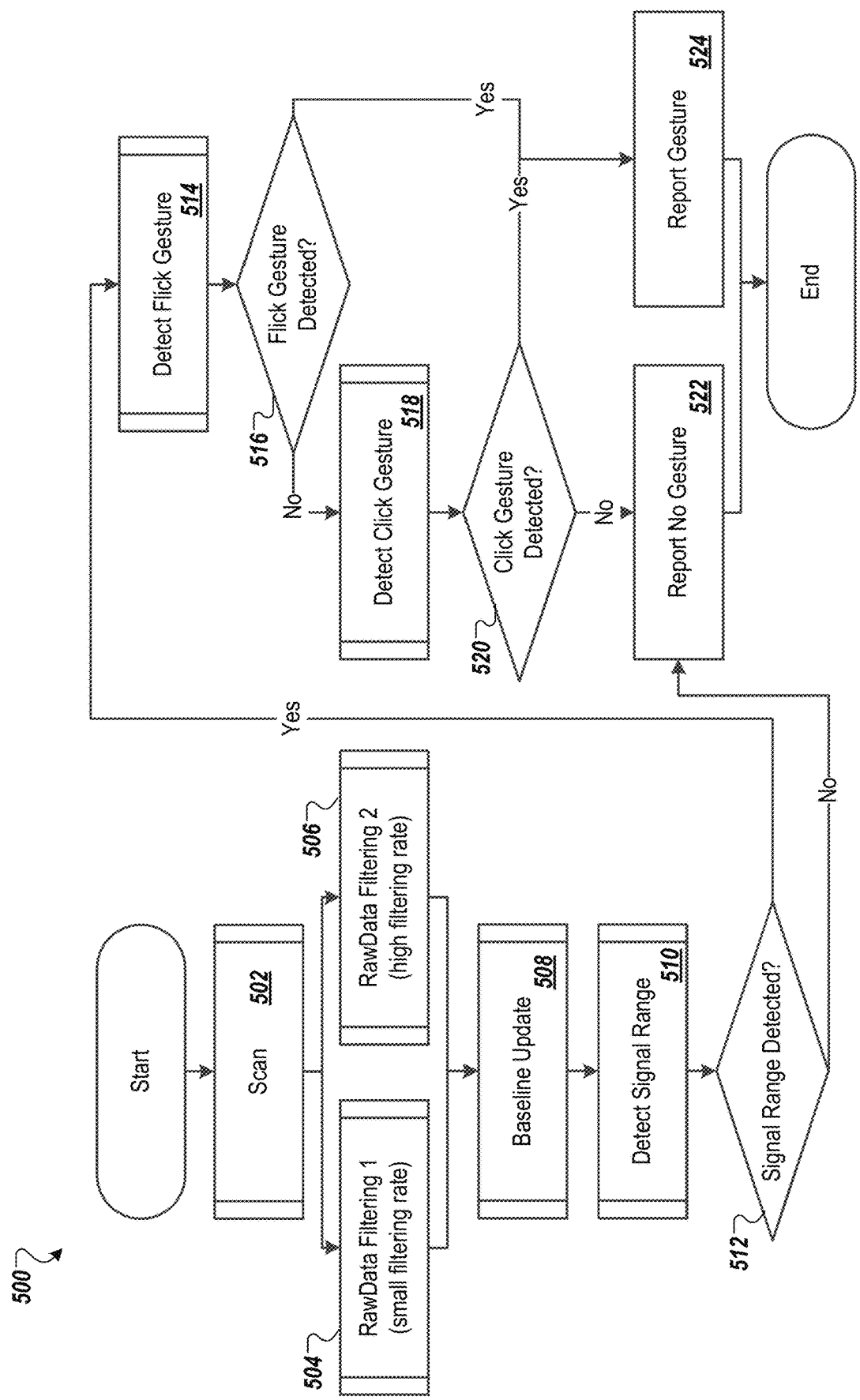
FIG. 5 is a flow diagram of a method of gesture detection according to at least one embodiment.

FIG. 5 is a flow diagram of a method 500 of gesture detection according to at least one embodiment. In some embodiments, processing logic may perform the method 500. The processing logic may include hardware, software, or any combination thereof. In another embodiment, the method 500 is performed by a touch controller. In another embodiment, the method 500 is performed by a proximity sensing circuit and a processing device coupled to the proximity sensing circuit. Alternatively, other components may be used to perform some or all of the operations of method 500.

Referring to FIG. 5, the processing logic begins the method 500 by scanning at least four electrodes over a period of time to obtain a digital signal for each of the at least four electrodes (block 502). As described herein, the at least four electrodes are located in a first plane. In one embodiment, the processing logic drives an electrode with a shield signal over the period of time, the electrode being located in a second plane parallel to the first plane. The processing logic measures signals associated with the at least four electrodes and converts the measured signals to digital signals. The digital signals can be used to detect an object and gestures by the object within a proximity detection area. For example, the processing logic can measure an amplitude value of the digital signal for each of the at least four electrodes. The processing logic outputs an indication of the gesture responsive to a ratio of a highest amplitude value and a lowest amplitude value satisfying a threshold criterion that represents the object being within a proximity detection area above the first plane.

Figure 6A:
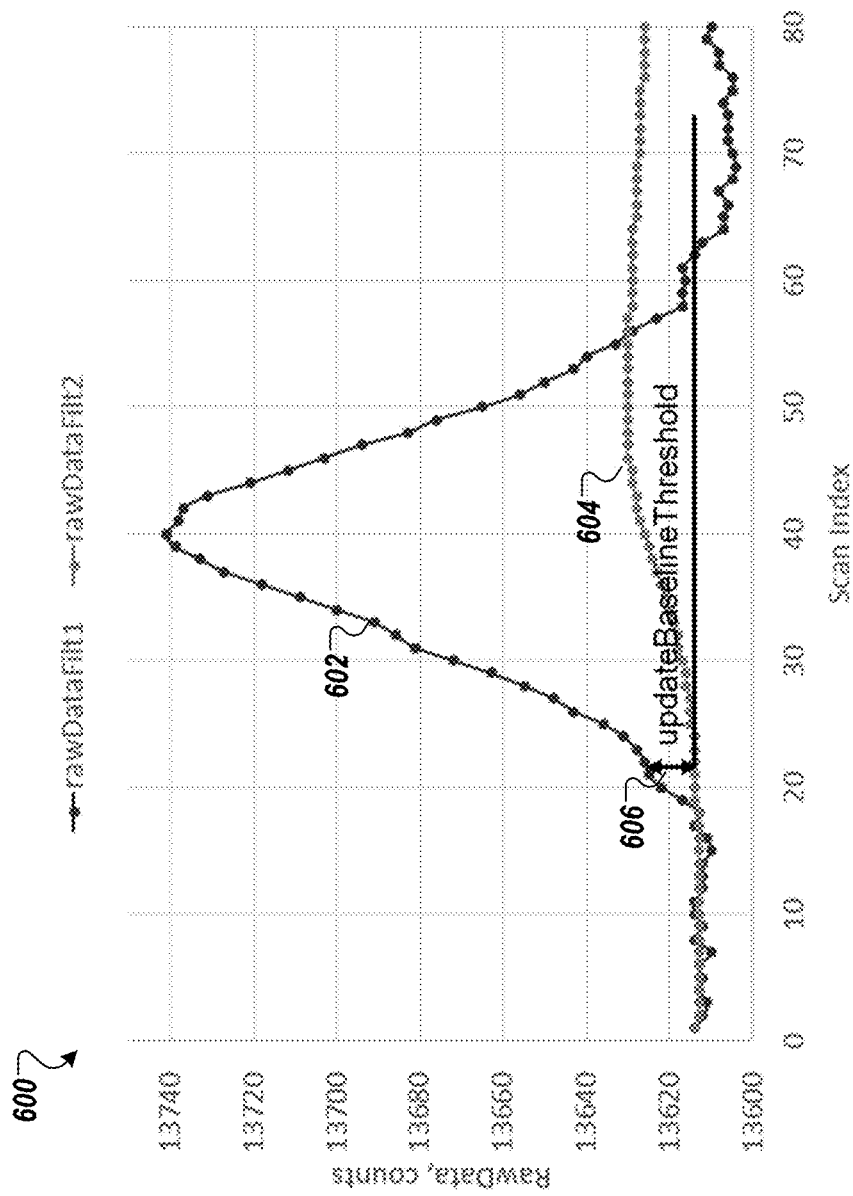
FIG. 6A is a graph of a number of scans over time for updating a baseline in the method of FIG. 5 according to at least one embodiment.

In the illustrated embodiment, to detect and determine whether to report a gesture, the processing logic filters the scan data (also called raw data) using two IIR filters. In at least one embodiment, for each digital signal of each of the at least four electrodes, the processing logic filters the digital signal using a first IIZ filter with a first filtering rate to obtain a first filtered signal (block 504) and using a second BR filter with a second filtering rate to obtain a second filtered signal (block 506). The processing logic performs a baseline update (block 508). The processing logic performs the baseline update by determining if a difference in values of the first filtered signal and the second filtered signal at an index satisfies a baseline threshold criterion and updates the baseline value to a value of the second filtered signal associated with the index where the baseline threshold criterion is satisfied, as illustrated in FIG. 6A. In at least one embodiment, the processing logic updates the baseline values for all sensors according to the following equations:

$$(\text{RawDataFilt1}_i - \text{RawDataFilt2}_i) \leq \text{updateBaselineThreshold}$$

where: i=[0; SENSOR_NUMBER−1]
updateBaselineThreshold−RawData increases in counts, which indicates an object near the proximity sensor.
Baseline update: $\text{Baseline}_i = \text{RawDataFilt2}_i$ The baseline update method allows the directional proximity sensor to work robustly if a grounded metal object or a floating metal object is set or removed in the vicinity of the directional proximity sensor.

FIG. 6A is a graph 600 of a number of scans over time for updating a baseline in the method of FIG. 5 according to at least one embodiment. The graph 600 shows a first filtered signal 602 and a second filtered signal 604. The baseline value is updated if the difference between the first filtered signal 602 and the second filtered signal at a given scan index is equal to or less than a baseline 606.

Figure 6B:
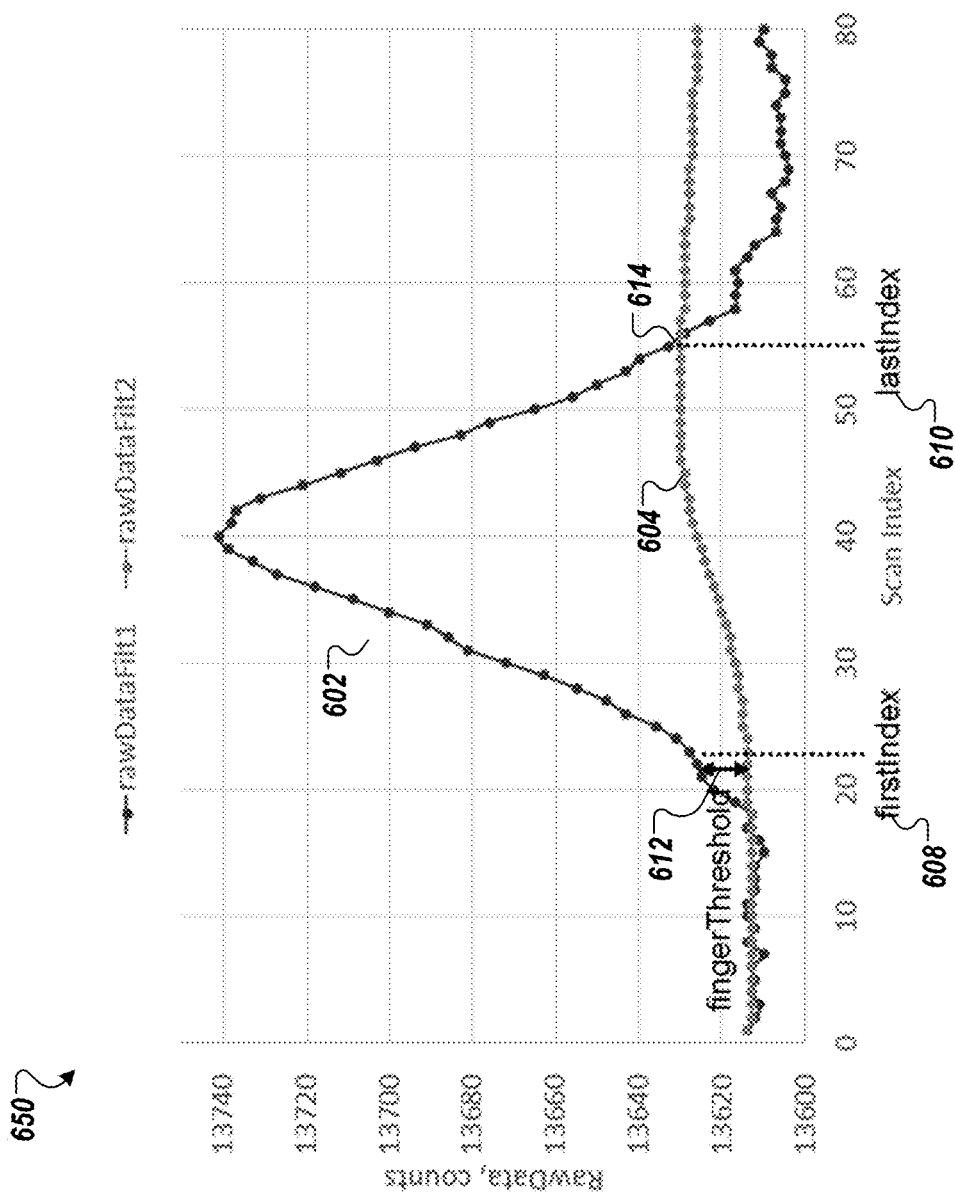
FIG. 6B is a graph of a number of scans over time for detecting a signal range for proximity detection in the method of FIG. 5 according to at least one embodiment.

Referring to FIG. 5, the processing logic determines whether a signal range is detected between the first and second filtered signals (blocks 510 and 512). The processing logic detects a gesture responsive to the signal range having i) a first data point (first index) where a difference in amplitude between the first filtered signal and the second filtered signal satisfies a second threshold criterion representing a presence of the object, and ii) a second data point (last index) where the first filtered signal is less than or equal to the second filtered signal after the difference in amplitude satisfies the second threshold criterion. The first data point is a first index of the signal range and the second data point is a last index of the signal range, as illustrated in FIG. 6B. In at least one embodiment, the first index and the last index of the range are calculated if the following expressions are true:

The first index is calculated if $(\text{RawDataFilt1}_i - \text{RawDataFilt2}_i) > \text{fingerThreshold}$ The last index is calculated if $\text{RawDataFilt1}_i \leq \text{RawDataFilt2}_i$ FIG. 6B is a graph 650 of a number of scans over time for detecting a signal range for proximity detection in the method of FIG. 5 according to at least one embodiment. The signal range is detected where a difference in amplitude between the first filtered signal 602 and the second filtered signal 604 satisfies a second threshold criterion 612 representing a presence of the object. The second threshold criterion 612 can be an object threshold (fingerThreshold). The signal range is detected when there is the first data point, and a subsequent difference 614 reaches zero, or the first filtered signal 602 is less than the second filtered signal 604 after the difference in amplitude satisfies the second threshold criterion 612. The signal range is defined as having a first index 608 at the first data point where the second threshold criterion 612 is met and a last index 610 at the second data point where the subsequent difference 614 reaches zero or the first filtered signal 602 is less than the second filtered signal 604.

Referring to FIG. 5, the swipe gesture and click gestures can be detected based on coordinates changing or not changing if the signal range is detected at block 512 in FIG. 5. If no signal range is detected at block 512, the processing logic reports no gesture (block 522). If the signal range is detected at block 512, the processing logic performs swipe gesture detection at blocks 514 and 516. If no swipe gesture is detected at block 516, the processing logic performs click gesture detection at blocks 518 and 520. If not click gesture is detected at block 520, the processing logic does not report a gesture (block 522), and the method 500 ends. If the click gesture is detected at block 520 or the swipe gesture is detected at block 516, the processing logic reports the gesture (block 524), and the method 500 ends.

In at least one embodiment, for each of the signal ranges detected, the processing logic determines X and Y positions for each scan between the first index 608 and the last index 610. The processing logic approximates dependencies between the X positions and the indexes and dependencies between the Y positions and the indexes using straight lines (e.g., a straight-line approximation can be used, such as illustrated in FIG. 9). The processing logic calculates differences between a first approximated position and a last approximated position for both directions (X and Y directions). The processing logic determines that the gesture is a swipe gesture at block 516 responsive to the differences, in either direction, satisfying a third threshold criterion. The third threshold criterion can specify that the differences in either direction meet or exceed a minimum distance. The processing logic determines that the gesture is a click gesture at block 520 responsive to the differences in both directions not satisfying the third threshold criterion. Additional details of gesture detection using coordinates are described below with respect to FIGS. 7-10B.

Figure 7:
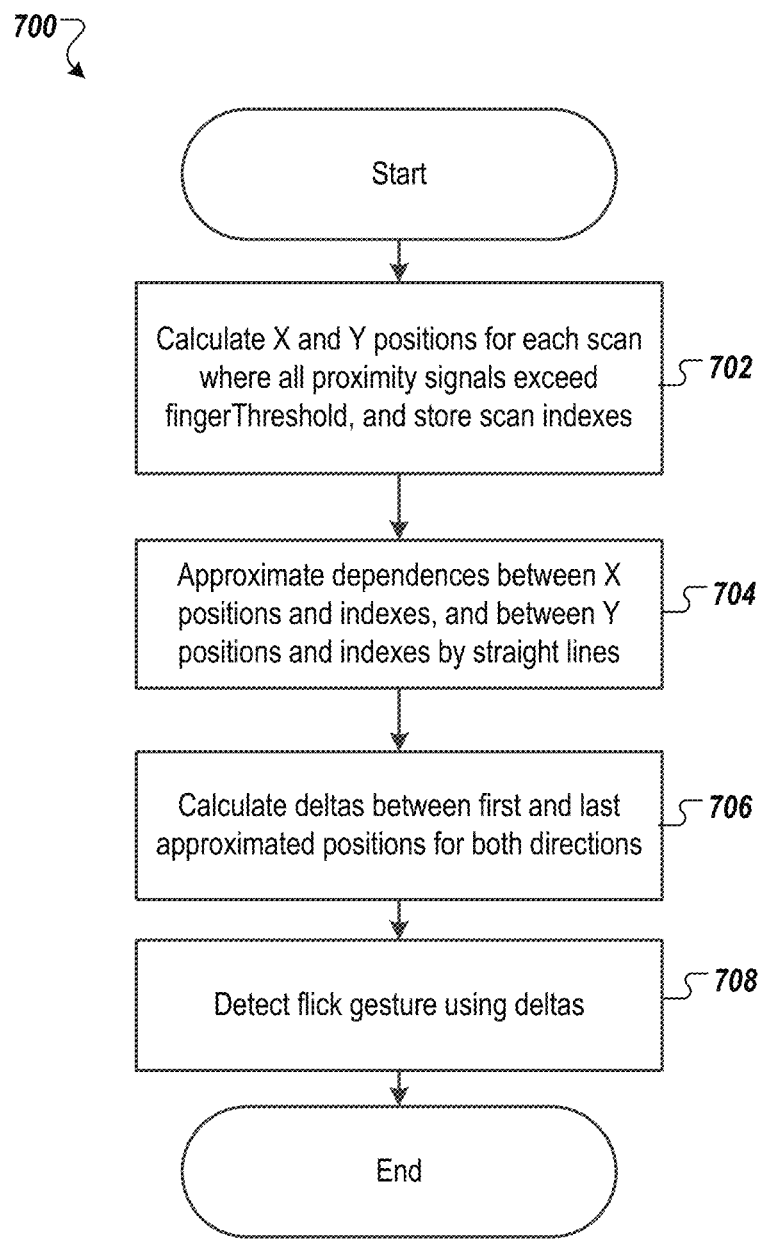
FIG. 7 is a flow diagram of a method for swipe gesture detection according to at least one embodiment.

FIG. 7 is a flow diagram of a method 700 for swipe gesture detection according to at least one embodiment. In some embodiments, processing logic may perform the method 700. The processing logic may include hardware, software, or any combination thereof. In another embodiment, the method 700 is performed by a touch controller. In another embodiment, the method 700 is performed by a proximity sensing circuit and a processing device coupled to the proximity sensing circuit. Alternatively, other components may be used to perform some or all of the operations of method 700.

Referring to FIG. 7, the processing logic begins the method 700 by calculating X and Y positions for each scan where all proximity signals exceed an object threshold (fingerThreshold) and stores scan indexes (block 702).

Figure 8A:
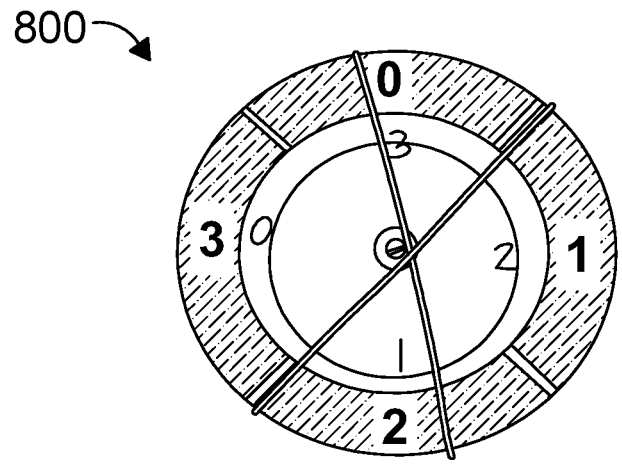
FIG. 8A illustrates a directional proximity sensor with four electrodes according to at least one embodiment.
Figure 9:
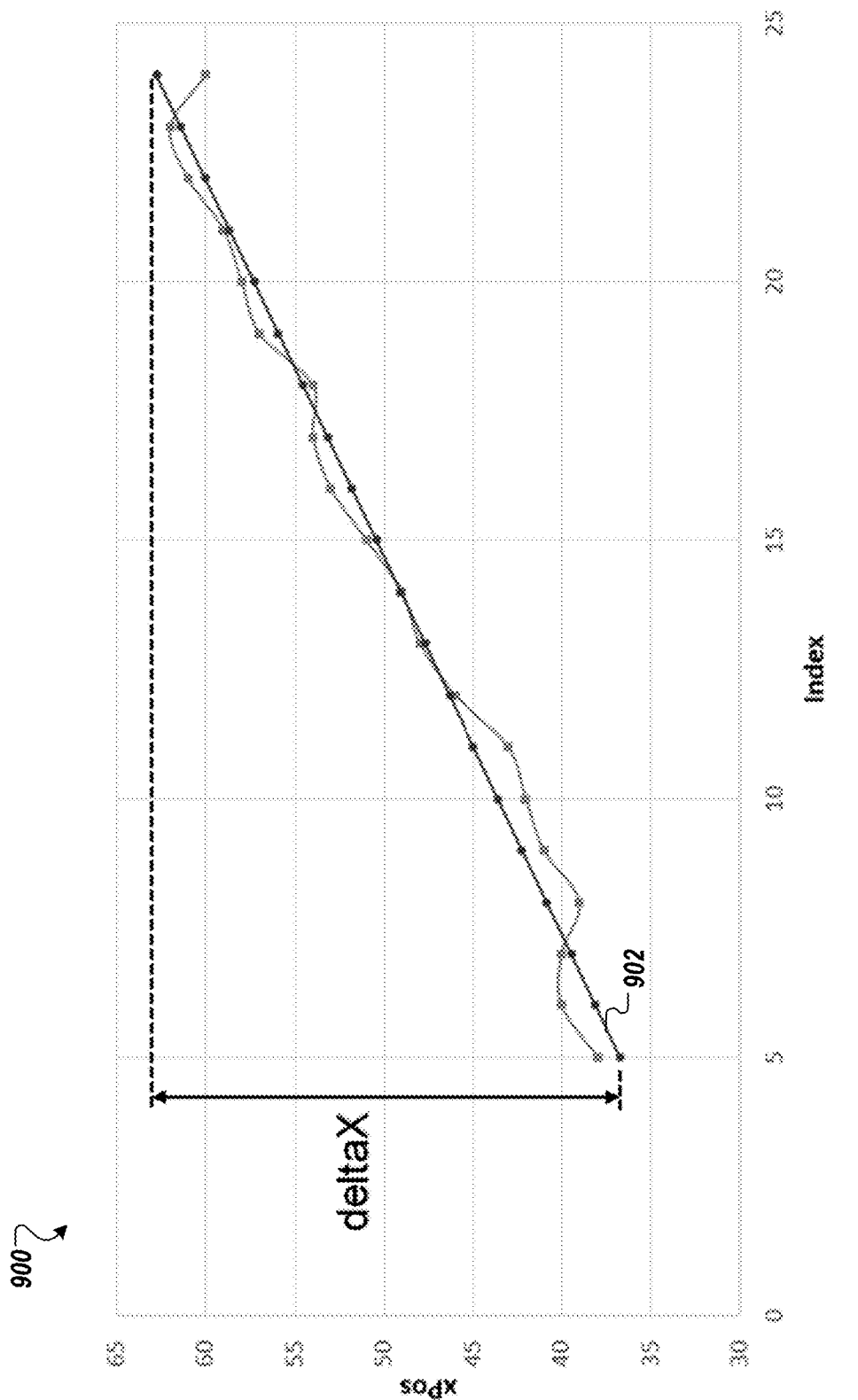
FIG. 9 is a graph of a straight-line approximation between X-positions and scan indexes according to at least one embodiment.

In at least one embodiment, the processing logic computes the X and Y positions using centroid equations, such as the following equation using the proximity signals from four electrodes of a direction proximity sensor 800 of FIG. 8A:

$$xPos = \frac{diff_3 \cdot 0 + (diff_0 + diff_2) \cdot \frac{Resolution}{2} + diff_1 \cdot Resolution}{diff_0 + diff_1 + diff_2 + diff_3}$$

$$yPos = \frac{diff_2 \cdot 0 + (diff_1 + diff_3) \cdot \frac{Resolution}{2} + diff_0 \cdot Resolution}{diff_0 + diff_1 + diff_2 + diff_3}$$

These equations can be simplified as follows:

$$\begin{cases} xPos = \frac{Resolution \cdot (2 \cdot diff_1 + diff_0 + diff_2)}{2 \cdot (diff_0 + diff_1 + diff_2 + diff_3)} \\ yPos = \frac{Resolution \cdot (2 \cdot diff_0 + diff_1 + diff_3)}{2 \cdot (diff_0 + diff_1 + diff_2 + diff_3)} \end{cases}$$

where $diff_i = RawDataFilt_i - Baseline_i$, i=0, ..., 3–signal response and Resolution is the sensor resolution in units.

Figure 8B:
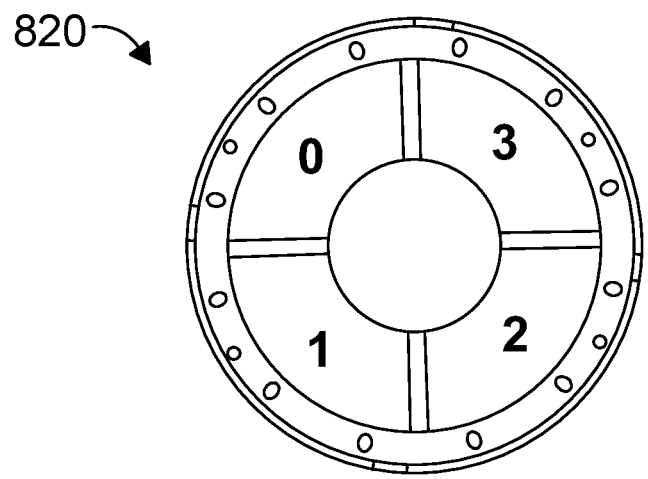
FIG. 8B illustrates a directional proximity sensor with four electrodes according to at least one embodiment.

FIG. 8B illustrates a directional proximity sensor 820 with four electrodes according to at least one embodiment. For the directional proximity sensor 820, the centroid equations can be as follows:

$$xPos = \frac{(diff_0 + diff_1) \cdot 0 + (diff_2 + diff_3) \cdot Resolution}{diff_0 + diff_1 + diff_2 + diff_3}$$

$$yPos = \frac{(diff_1 + diff_2) \cdot 0 + (diff_0 + diff_3) \cdot Resolution}{diff_0 + diff_1 + diff_2 + diff_3}$$

These equations can be simplified as follows:

$$\begin{cases} xPos = \frac{Resolution \cdot (diff_2 + diff_3)}{diff_0 + diff_1 + diff_2 + diff_3} \\ yPos = \frac{Resolution \cdot (diff_0 + diff_3)}{diff_0 + diff_1 + diff_2 + diff_3} \end{cases}$$

Figure 8C:
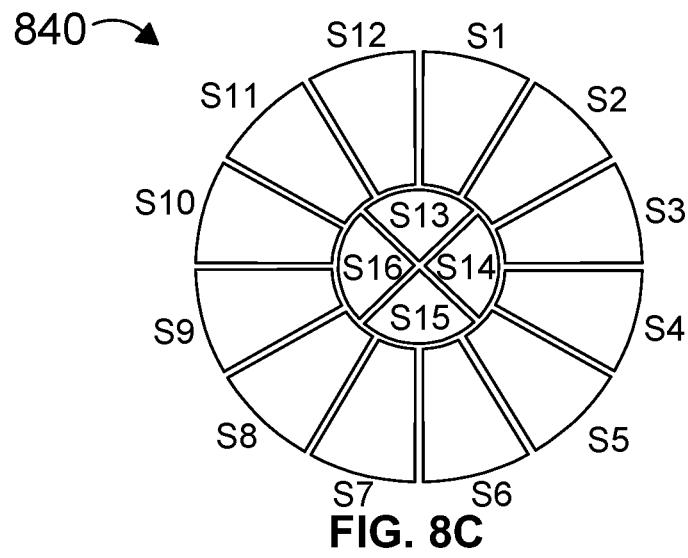
FIG. 8C illustrates a directional proximity sensor with sixteen electrodes according to at least one embodiment.

FIG. 8C illustrates a directional proximity sensor 840 with sixteen electrodes according to at least one embodiment. Similar equations can be used for proximity signals from the sixteen electrodes of the directional proximity sensor 840.

Referring to FIG. 7, for swipe gesture detection, the processing logic can calculate vectors of the X and Y positions using the centroid equations above at block 702. The processing logic approximates the dependencies between X positions and indexes and dependencies between Y positions and indexes (block 704). The processing logic approximates the dependence between xPos and index and the dependence between yPos and index by a straight line as set forth below:

$$posApprox_i = k \cdot index_i + b$$

For approximations, the processing logic can minimize the function as expressed below:

$$Q = \sum_{i=0}^{N-1} (posApprox_i - pos_i)^2 \to \min$$

The processing logic can use a partial deviation to calculate parameters k and b as follows:

$$\begin{cases} \frac{\partial Q}{\partial k} = 2 \cdot \sum_{i=0}^{N-1} (k \cdot index_i + b - pos_i) \cdot index_i = 0 \\ \frac{\partial Q}{\partial b} = 2 \cdot \sum_{i=0}^{N-1} (k \cdot index_i + b - pos_i) = 0 \end{cases}$$

After simplification, the equations can be expressed as follows:

$$\begin{cases} k \cdot \sum_{i=0}^{N-1} index_i^2 + b \cdot \sum_{i=0}^{N-1} index_i = \sum_{i=0}^{N-1} pos_i \cdot index_i \\ k \cdot \sum_{i=0}^{N-1} index_i + N \cdot b = \sum_{i=0}^{N-1} pos_i \end{cases}$$

From this equation, the following equation can be derived:

$$\begin{cases} k = \frac{N \cdot \sum_{i=0}^{N-1} pos_i \cdot index_i - \sum_{i=0}^{N-1} pos_i \cdot \sum_{i=0}^{N-1} index_i}{N \cdot \sum_{i=0}^{N-1} index_i^2 - \left(\sum_{i=0}^{N-1} index_i\right)^2} \\ b = \frac{\sum_{i=0}^{N-1} pos_i \cdot \sum_{i=0}^{N-1} index_i^2 - \sum_{i=0}^{N-1} pos_i \cdot index_i \cdot \sum_{i=0}^{N-1} index_i}{N \cdot \sum_{i=0}^{N-1} index_i^2 - \left(\sum_{i=0}^{N-1} index_i\right)^2} \end{cases}$$

Since the swipe gestures are detected based on coordinates changing, the following delta calculation can be used:

$$deltaX = XposApprox_{N-1} - XposApprox_0 = k \cdot index_{N-1} + b - (k \cdot index_0 + b)$$

From the last two equations above, the following equations can be derived:

$$\begin{cases} deltaX = \frac{\left(N \cdot \sum_{i=0}^{N-1} xPos_i \cdot index_i - \sum_{i=0}^{N-1} xPos_i \cdot \sum_{i=0}^{N-1} index_i\right) \cdot (index_{N-1} - index_0)}{N \cdot \sum_{i=0}^{N-1} index_i^2 - \left(\sum_{i=0}^{N-1} index_i\right)^2} \\ deltaY = \frac{\left(N \cdot \sum_{i=0}^{N-1} yPos_i \cdot index_i - \sum_{i=0}^{N-1} yPos_i \cdot \sum_{i=0}^{N-1} index_i\right) \cdot (index_{N-1} - index_0)}{N \cdot \sum_{i=0}^{N-1} index_i^2 - \left(\sum_{i=0}^{N-1} index_i\right)^2} \end{cases}$$

Examples of delta calculations based on the straight-line approximation are shown in FIG. 9.

FIG. 9 is a graph 900 of a straight-line approximation 902 between X-positions and scan indexes according to at least one embodiment. The graph 900 shows the delta position 904 in the X dimension. The processing logic computes the delta position 904 using the equations above. Similarly, the processing logic computes a delta position in the Y dimension using these equations above. Once the delta positions are computed, the processing logic can determine a direction of the swipe gesture using a multi-direction detection scheme, such as the 8-way and 4-way gesture detection schemes of FIGS. 10A-10B.

Figure 10A:
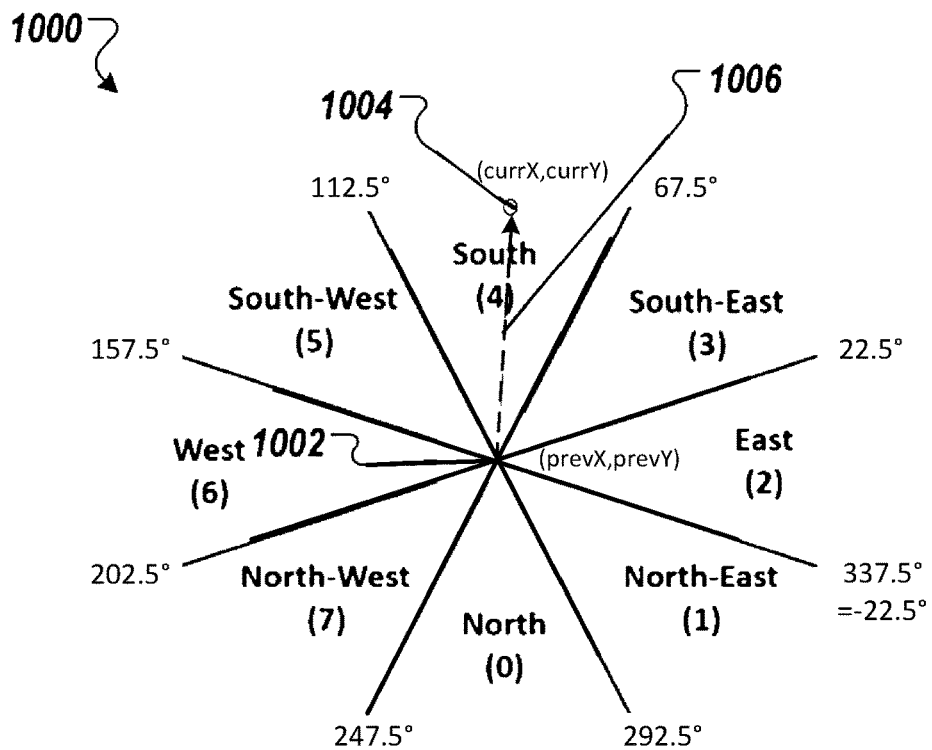
FIG. 10A is a graph of an 8-way single-touch gesture detection scheme according to at least one embodiment.

FIG. 10A is a graph 1000 of an 8-way single-touch gesture detection scheme according to at least one embodiment. The 8-way single-touch gesture detection scheme can be used to detect eight directional swipe gestures based on the delta positions computed above. Graph 1000 shows the indexes that indicate a direction of a swipe gesture 1006, including 0-7, and 8 represents that no swipe gestures are detected. Graph 1000 shows a center coordinate 1002 representing a previous position (prevX, prevY) and a current coordinate 1004 representing a current position (currX, currY). A south (4) swipe gesture is detected in this example. The processing logic can determine an angle of the swipe gesture 1006 using the following equations. The swipe gesture 1006 is considered a south swipe gesture that corresponds to a direction within a range of approximately 112.5 degrees and 67.5 degrees.

In at least one embodiment, the 8-way single-touch gesture detection scheme can compute the following:

$$\begin{cases} deltaX = currX - prevX \\ deltaY = currY - prevY \end{cases}$$

The equation for the straight line is expressed as follows:

$$y = k \cdot x + b$$

where:

$$k = \frac{currY - prevY}{currX - prevX}, \text{ and}$$

$$\text{angle} = a\tan(k)$$

Using the straight-line equation above, since the swipe gesture 1006 passes through the previous position at the center coordinate 1002, the following equations can be used.

$$prevY = k \cdot prevX + b \rightarrow b = prevY - k \cdot prevX \rightarrow deltaY = k \cdot deltaX$$

Each of the swipe gestures can be defined as equations corresponding to ranges of angles, such as set forth below:

$$\begin{cases} 4: 67.5° \le \text{angle} < 112.5° & k \in (-\infty; -2.41) \cup [2.41; +\infty) \\ 5: 112.5° \le \text{angle} < 157.5° & k \in [-2.41; -0.41) \\ 6: 157.5° \le \text{angle} < 202.5° & k \in [-0.41; 0.41) \\ 7: 202.5° \le \text{angle} < 247.5° & k \in [0.41; 2.41) \\ 0: 247.5° \le \text{angle} < 292.5° & k \in (-\infty; -2.41) \cup [2.41; +\infty) \\ 1: 292.5° \le \text{angle} < 337.5° & k \in [-2.41; -0.41) \\ 2: -22.5° \le \text{angle} < 22.5° & k \in [-0.41; 0.41) \\ 3: 22.5° \le \text{angle} < 67.5° & k \in [0.41; 2.41) \end{cases}$$

These equations can be rewritten in code as follows:

```
if (deltaY ≥ 2.41 · deltaX)
    if(deltaY/deltaX < -2.41)
        direct8Way = 4
    else
        if(deltaY/deltaX < -0.41)
            direct8Way = 5
        else
            if(deltaY/deltaX < 0.41)
                direct8Way = 6
            else
                if(deltaY/deltaX < 2.41)
                    direct8Way = 7
                else
                    direct8Way = 4
                end
            end
        end
    end
else
    if(deltaY/deltaX < -2.41)
        direct8Way = 0
    else
        if(deltaY/deltaX < -0.41)
            direct8Way = 1
        else
            if(deltaY/deltaX < 0.41)
                direct8Way = 2
            else
                if(deltaY/deltaX < 2.41)
                    direct8Way = 3
                else
                    direct8Way = 0
                end
            end
        end
    end
end
```

The equations for an 8-way single-touch gesture scheme can be expressed as follows:

$$\begin{cases} deltaX = currX - prevX \\ deltaY = 12 \cdot (currY - prevY) \end{cases}$$

$$\text{if}\left(\frac{deltaY}{deltaX} < -29\right)$$

$$direct8Way = 0$$

else $$\text{if}\left(\frac{deltaY}{deltaX} < -5\right)$$

$$direct8Way = 1$$

else $$\text{if}\left(\frac{deltaY}{deltaX} < 5\right)$$

$$direct8Way = 2$$

else $$\text{if}\left(\frac{deltaY}{deltaX} < 29\right)$$

$$direct8Way = 3$$

```
        else
            direct8Way = 0
        end
      end
    end
  end
end
if (deltaY ≥ 29 · deltaX)
    direct8Way = direct8Way + 4
end
```

Figure 10B:
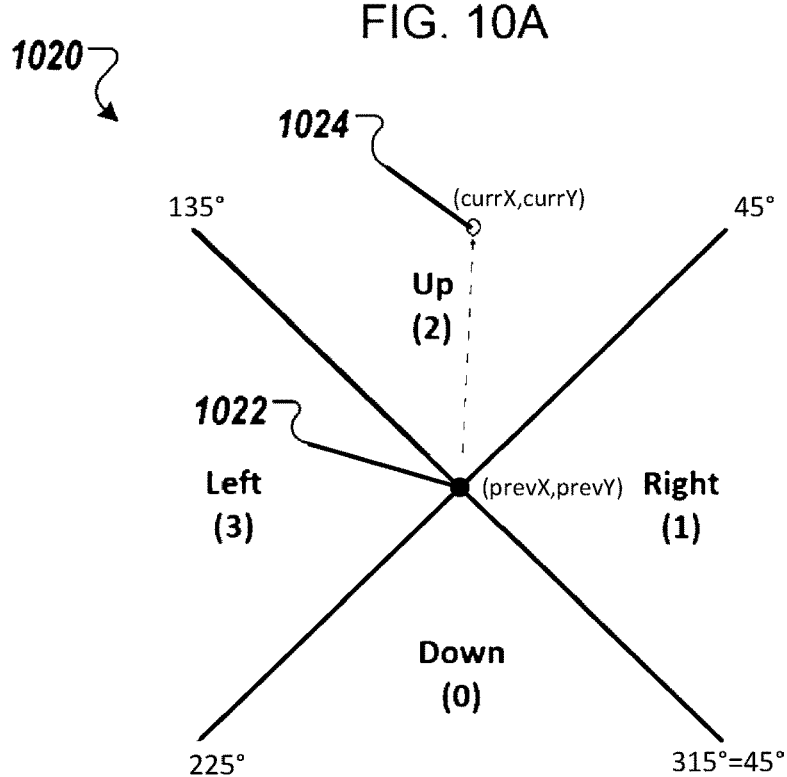
FIG. 10B is a graph of a 4-way single-touch gesture detection scheme according to at least one embodiment.

FIG. 10B is a graph 1020 of a 4-way single-touch gesture detection scheme according to at least one embodiment. The 4-way single-touch gesture detection scheme can be used to detect four-directional swipe gestures based on the delta positions computed above. Graph 1200 shows the indexes that indicate a swipe gesture direction, including 0-3, and 4 represents that no swipe gestures are detected. Graph 1020 shows a center coordinate 1022 representing a previous position (prevX, prevY) and a current coordinate 1024 representing a current position (currX, currY). An up (2) swipe gesture is detected in this example. The processing logic can determine the angle of the swipe gesture using the following equations. The up swipe gesture corresponds to a direction within a range of approximately 135 degrees and 45 degrees.

In at least one embodiment, the 4-way single-touch gesture detection scheme can use the following equations:

$$\begin{cases} deltaY = k \cdot deltaX \\ k = \tan(angle) \end{cases}$$

$$\begin{cases} 2: 45° \leq angle < 135° & k \in (-\infty; -1) \cup (1; +\infty) \\ 3: 135° \leq angle < 225° & k \in [-1; 1) \\ 0: 225° \leq angle < 315° & k \in (-\infty; -1) \cup (1; +\infty) \\ 1: -45° \leq angle < 45° & k \in [-1; 1) \end{cases}$$

These equations rewritten as code are as follows:

```
if (deltaY ≥ deltaX)
```

$$\text{if}\left(\frac{deltaY}{deltaX} < -1\right)$$

$$direct4Way = 2$$

```
    else
        direct4Way = 3
    end
else
```

$$\text{if}\left(\frac{deltaY}{deltaX} < -1\right)$$

$$direct4Way = 0$$

```
    else
        direct4Way = 1
    end
end
```

The equations for 4-way single-touch gesture scheme can be expressed as follows:

$$\text{if}\left(\frac{deltaY}{deltaX} < -256\right)$$

$$direct4Way = 0$$

```
else
    direct4Way = 1
                                    (16)
end
if (deltaY ≥ deltaX)
    direct4Way = direct4Way + 2
end
```

In at least one embodiment, the swipe gesture method can have three tunable parameters: Resolution, flickActiveDistanceX, and flickActiveDistanceY. The parameter Resolution is the sensor resolution in units. The parameter flickActiveDistanceX is the minimum active distance (in resolution units) to be exceeded in the X direction before motion is considered as a swipe gesture. The parameter flickActiveDistanceY is the minimum active distance (in resolution units) to be exceeded in the Y direction before motion is considered as a swipe gesture.

Referring to FIG. 5, the detect click gesture method at block 518 can be run only if the swipe gesture is not detected at block 516. The detect click gesture method at block 518 detects a click gesture if the position displacement of the object above the proximity sensor does not exceed a click distance threshold (maxClickDistance) during a time period (minClickTimeout) scans after a touching-down event was detected. In at least one embodiment, the click gesture detection method at block 518 can have two tunable parameters, maxClickDistance, and minClickTimeout. The parameter maxClickDistance is the maximum position displacement (in resolution units) for a click event. The parameter minClickTimeout is the minimum duration in the number of scans that an object (e.g., hand) can stay above the proximity sensor to qualify as a click gesture. Alternatively, other parameters can be used to classify a click gesture.

As described above, the processing logic can perform a reject gesture method if any gesture is detected to make sure that the gesture is not from a side of the proximity sensor (or not within the proximity detection area). The reject gesture method can reject unwanted gestures from the side of the proximity sensor, such as illustrated in the gestures by the objects shown in FIGS. 2D-2E. In at least one embodiment, the reject gesture method can use the equation below:

$$\frac{2 \cdot maxSignalAmplitude}{minSignalAmplitude} \geq maxMinRatio$$

where $maxSignalAmplitude =$ $$\max_i(\max S_i) \text{ and } minSignalAmplitude = \min_i(\max S_i),$$

and
where $maxS_i$ is maximum response signals from each sensor during some period of time (e.g., during the last 50 scans).

The reject gesture method can include one tunable parameter, maxMinRatio. The parameter maxMinRatio represents a ratio where the gesture should be rejected as a gesture in the gesture detection area above the directional proximity sensor.

In another embodiment, the processing logic detects the gesture by an object within a maximum distance of 15 centimeters above the plane of the electrodes of the proximity sensor. The processing logic distinguishes between the proximity of an object that is not directly above the sensor layer and the proximity of an object directly above the sensor. In another embodiment, the processing logic detects a presence of a second object that is not directly above the sensor layer. The second object is a grounded or floating metal object set or removed in the vicinity of the proximity sensor. The processing logic can dynamically update baseline values of the electrodes responsive to the digital signals satisfying a threshold criterion. In at least one embodiment, the baseline values are not greater than a lowest value in the digital signal. In at least one embodiment, the processing logic updates a baseline value to a lowest value of the digital signal responsive to the first number satisfying the second threshold criterion and the subsequent values of the digital signal satisfying a baseline threshold criterion. The processing logic can rest the baseline value responsive to the indication being output or no gesture being detected.

Figure 11:
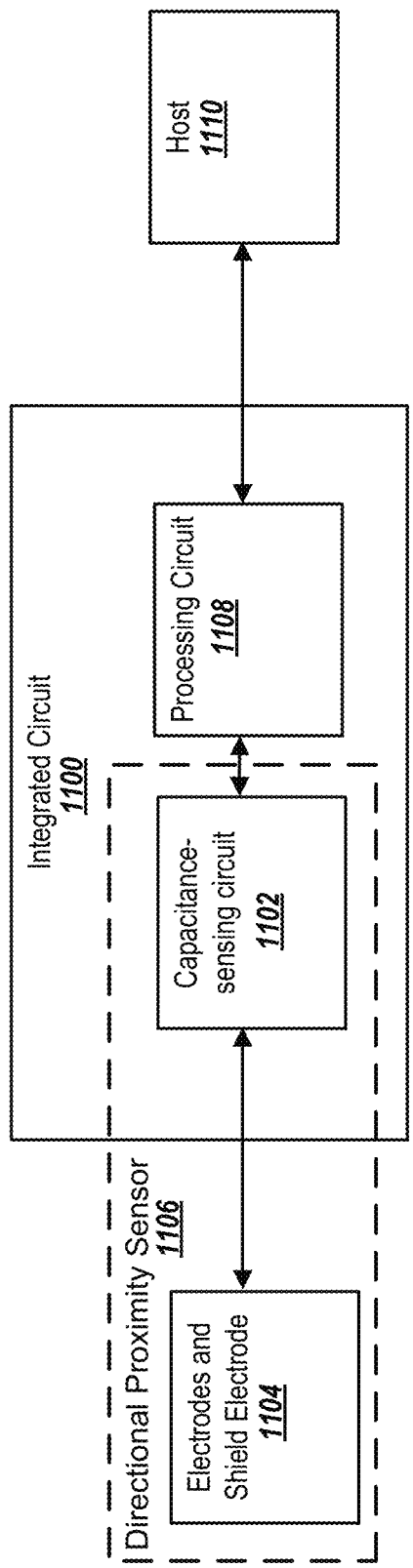
FIG. 11 is a block diagram of an integrated circuit with a capacitance-sensing circuit and a processing circuit according to at least one embodiment.

FIG. 11 is a block diagram of an integrated circuit 1100 with a capacitance-sensing circuit 1102 and a processing circuit 1108 according to at least one embodiment. The capacitance-sensing circuit 1102 is coupled to electrodes and shield electrode 1104. The capacitance-sensing circuit 1102 and electrodes 1104 form a directional proximity sensor 1106 similar to the directional proximity sensor 102 of FIG. 1A, the directional proximity sensor 130 of FIGS. 1C-1D, the directional proximity sensor 200 of FIG. 2A-2E, or the direction proximity sensors 800, 820, 840 of FIGS. 8A-8C. The processing circuit 1108 is coupled to the capacitance-sensing circuit 1102. The capacitance-sensing circuit 1102 includes an ADC and outputs digital signals to the processing circuit 1108. As described above, the processing circuit 1108 processes the digital signals to detect and report gestures. The processing circuit 1108 can report the gestures to a host device 1110.

The integrated circuit 1100 can be used as part of a touch user interface for a variety of devices (e.g., smart speakers, laptops, tablets, mobile phones, toys, appliances, and the like) by providing an intuitive way for the user to interact with the device while increasing a proximity detection distance, providing directionality to the proximity sensing within a specific area, and providing proximity detection in the presence of metal objects or other noise sources near the device. The integrated circuit 1100 can provide an alternate way to allow touch activation in high traffic areas where classic switch control mechanisms have become contamination points for dirt build-up and germs, such as activation buttons for handicap access and activation buttons for crosswalks, or the like. The integrated circuit 1100 can be used in various devices as a "wake-on-approach" feature or as a system-wake source. The "wake-on-approach" can allow a device to achieve a lowest system power. The integrated circuit 1100 can provide intuitive and responsive control options to a host device and integrated 2D and 3D gesture support libraries. The integrated circuit 1100 can be integrated into smart speakers, home appliances, industrial appliances, wearable devices, smart home devices, or the like.

The embodiments described herein may be used in various designs of mutual-capacitance sensing arrays of the capacitance sensing system, or in self-capacitance sensing arrays. In one embodiment, the capacitance sensing system detects multiple sense elements that are activated in the array, and can analyze a signal pattern on the neighboring sense elements to separate noise from the actual signal. The embodiments described herein are not tied to a particular capacitive sensing solution and can be used as well with other sensing solutions, including optical sensing solutions, radar sensing solutions, ultrasound sensing solutions, or the like, as would be appreciated by one of ordinary skill in the art having the benefit of this disclosure.

In the above description, numerous details are set forth. It will be apparent, however, to one of ordinary skill in the art having the benefit of this disclosure, that embodiments of the present disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "applying," "coupling," "communicating," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

Embodiments described herein may also relate to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer-readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions. The term "computer-readable storage medium" should be taken to include a single medium or multiple media (e.g., a centralized or distributed database and/or associated caches and servers) that store one or more sets of instructions. The term "computer-readable medium" shall also be taken to include any medium that is capable of storing, encoding, or carrying a set of instructions for execution by the machine and that causes the machine to perform any one or more of the methodologies of the present embodiments. The term "computer-readable storage medium" shall accordingly be taken to include, but not be limited to, solid-state memories, optical media, magnetic media, any medium that is capable of storing a set of instructions for execution by the machine and that causes the machine to perform any one or more of the methodologies of the present embodiments.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the embodiments as described herein.

The above description sets forth numerous specific details, such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth above are merely exemplary. Particular implementations may vary from these exemplary details and still be contemplated to be within the scope of the present disclosure.

It is to be understood that the above description is intended to be illustrative and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. An apparatus comprising:
   a sensor layer comprising at least three electrodes disposed in a first plane;
   a shield layer comprising an electrode disposed in a second plane parallel to the first plane;
   an insulator located between the sensor layer and the shield layer; and
   a processing device coupled to the at least three electrodes and the electrode, wherein the processing device is configured to:
   scan the at least three electrodes over a period of time to obtain a digital signal for each of the at least three electrodes while driving a shield signal on the electrode of the shield layer;
   detect a gesture by an object using the digital signals;
   measure an amplitude value of the digital signal for each of the at least three electrodes; and
   output an indication of the gesture responsive to a ratio of a highest amplitude value and a lowest amplitude value satisfying a first threshold criterion that represents the object being within a proximity detection area above the sensor layer.

2. The apparatus of claim 1, wherein the processing device, for each of the digital signals, is to:
   filter the digital signal using an infinite impulse response (IIR) filter to obtain a filtered signal;
   determine a first number of consecutive positive increases in the filtered signal; and
   detect the gesture responsive to at least the first number satisfying a second threshold criterion.

3. The apparatus of claim 2, wherein the processing device, for each of the digital signals, is to:
   determine a second number of consecutive negative decreases in the filtered signal; and
   determine that the gesture is a swipe gesture responsive to the first number satisfying the second threshold criterion and the second number satisfying a third threshold criterion; or
   determine that the gesture is a click gesture responsive to the first number satisfying the second threshold criterion and the second number not satisfying the third threshold criterion.

4. The apparatus of claim 2, wherein the processing device, for each of the digital signals, is to:
   update a baseline value to a lowest value of the digital signal responsive to the first number satisfying the second threshold criterion and the subsequent values of the digital signal satisfying a baseline threshold criterion; and
   reset the baseline value responsive to the indication being output or no gesture being detected.

5. The apparatus of claim 1, wherein the processing device, for each of the digital signals, is to:

filter the digital signal using a first infinite impulse response (IIR) filter with a first filtering rate to obtain a first filtered signal;

filter the digital signal using a second IIR filter with a second filtering rate to obtain a second filtered signal;

determine a signal range between the first filtered signal and the second filtered signal; and detect the gesture responsive to the signal range comprising:
- a first data point where a difference in amplitude between the first filtered signal and the second filtered signal satisfies a second threshold criterion representing a presence of the object; and
- a second data point where the first filtered signal is less than the second filtered signal after the difference in amplitude satisfies the second threshold criterion, wherein the first data point is a first index of the signal range and the second data point is a last index of the signal range.

6. The apparatus of claim 5, wherein the processing device, for each of the signal ranges detected, is to:

determine X and Y positions for each scan between the first index and the last index;

approximate dependencies between the X positions and the indexes and dependencies between the Y positions and the indexes using straight lines;

calculate differences between a first approximated position and a last approximated position for both directions; and determine that the gesture is a swipe gesture responsive to the differences in either direction satisfying a third threshold criterion; or determine that the gesture is a click gesture responsive to the differences in both directions not satisfying the third threshold criterion.

7. The apparatus of claim 5, wherein the processing device, for each of the signal ranges detected, is to:

update a baseline value to a value of the second filtered signal responsive to a difference in values of the first filtered signal and the second filtered signal at an index satisfies a baseline threshold criterion.

8. The apparatus of claim 1, wherein the processing device comprises a capacitance-sensing circuit, for each of the at least three electrodes, to determine digital values of the digital signal, the digital values representing self-capacitance values of the respective electrode over the period of time while driving the shield signal on the electrode of the shield layer.

9. The apparatus of claim 1, wherein the sensor layer comprises:

a first electrode located on a first side of the apparatus;

a second electrode located on a second side opposite the first side;

a third electrode located on a third side of the apparatus; and a fourth electrode located on a fourth side opposite the third side, wherein the electrode is a planar electrode located below the first, second, third, and fourth electrodes.

10. The apparatus of claim 1, wherein the processing device is configured to:

detect the gesture by the object within a maximum distance of 15 centimeters above the first plane; and distinguish between proximity of an object that is not directly above the sensor layer and proximity of an object this is directly above the sensor layer.

11. The apparatus of claim 1, wherein the processing device is configured to:

detect a presence of a second object that is not directly above the sensor layer, wherein the second object is a grounded or floating metal object that is set or removed in a vicinity of the apparatus; and dynamically update baseline values of the at least three electrodes responsive to the digital signals satisfying a threshold criterion, wherein the baseline values are not greater than a lowest value in the digital signal.

12. A method comprising:

scanning at least three electrodes over a period of time to obtain a digital signal for each of the at least three electrodes, the at least three electrodes being located in a first plane;

driving an electrode with a shield signal over the period of time, the electrode being located in a second plane parallel to the first plane;

detecting a gesture by an object using the digital signals;

measuring an amplitude value of the digital signal for each of the at least three electrodes; and outputting an indication of the gesture responsive to a ratio of a highest amplitude value and a lowest amplitude value satisfying a threshold criterion that represents the object being within a proximity detection area above the first plane.

13. The method of claim 12, further comprising for each of the digital signals:

filtering the digital signal using an infinite impulse response (IIR) filter to obtain a filtered signal;

determining a first number of consecutive positive increases in the filtered signal;

determining a second number of consecutive negative decreases in the filtered signal; and determining that the gesture is a swipe gesture responsive to the first number satisfying a second threshold criterion and the second number satisfying a third threshold criterion; or determining that the gesture is a click gesture responsive to the first number satisfying the second threshold criterion and the second number not satisfying the third threshold criterion.

14. The method of claim 13, further comprising for each of the digital signals:

updating a baseline value to a lowest value of the digital signal responsive to the first number satisfying the second threshold criterion and the subsequent values of the digital signal satisfying a baseline threshold criterion; and resetting the baseline value responsive to the indication being output or no gesture being detected.

15. The method of claim 12, further comprising for each of the digital signals:

filtering the digital signal using a first infinite impulse response (IIR) filter with a first filtering rate to obtain a first filtered signal;

filtering the digital signal using a second IIR filter with a second filtering rate to obtain a second filtered signal;

determining a signal range between the first filtered signal and the second filtered signal; and detecting the gesture responsive to the signal range comprising:
- a first data point where a difference in amplitude between the first filtered signal and the second filtered signal satisfies a second threshold criterion representing a presence of the object; and a second data point where the first filtered signal is less than the second filtered signal after the difference in amplitude satisfies the second threshold criterion, wherein the first data point is a first index of the signal range and the second data point is a last index of the signal range.

16. The method of claim 15, further comprising for each of the signal ranges:
  determining X and Y positions for each scan between the first index and the last index;
  approximating dependencies between the X positions and the indexes and dependencies between the Y positions and the indexes using straight lines;
  calculating differences between a first approximated position and a last approximated position for both directions; and
  determining that the gesture is a swipe gesture responsive to the differences in either direction satisfying a third threshold criterion; or
  determine that the gesture is a click gesture responsive to the differences in both directions not satisfying the third threshold criterion.

17. The method of claim 15, further comprising for each of the signal ranges:
  updating a baseline value to a value of the second filtered signal responsive to a difference in values of the first filtered signal and the second filtered signal at an index satisfies a baseline threshold criterion.

18. An integrated circuit comprising:
  a proximity sensing circuit to scan at least three electrodes over a period of time to obtain a digital signal for each of the at least three electrodes while driving a shield signal on an electrode, the at least three electrodes being located in a sensor layer in a first plane and the electrode being located in a shield layer; and
  a processing circuit coupled to the proximity sensing circuit, wherein the processing circuit is to:
    detect a gesture by an object using the digital signals;
    measure an amplitude value of the digital signal for each of the at least three electrodes;
    output an indication of the gesture responsive to a ratio of a highest amplitude value and a lowest amplitude value satisfying a first threshold criterion that represents the object being within a proximity detection area above the sensor layer.

19. The integrated circuit of claim 18, wherein the processing circuit, for each of the digital signals, is to:
  filter the digital signal using an infinite impulse response (IIR) filter to obtain a filtered signal;
  determine a first number of consecutive positive increases in the filtered signal;
  determine a second number of consecutive negative decreases in the filtered signal; and
  determine that the gesture is a swipe gesture responsive to the first number satisfying a second threshold criterion and the second number satisfying a third threshold criterion; or
  determine that the gesture is a click gesture responsive to the first number satisfying the second threshold criterion and the second number not satisfying the third threshold criterion.

20. The integrated circuit of claim 18, wherein the processing circuit, for each of the digital signals, is to:
  filter the digital signal using a first infinite impulse response (IIR) filter with a first filtering rate to obtain a first filtered signal;
  filter the digital signal using a second IIR filter with a second filtering rate to obtain a second filtered signal;
  determine a signal range between the first filtered signal and the second filtered signal; and
  detect the gesture responsive to the signal range comprising:
    a first data point where a difference in amplitude between the first filtered signal and the second filtered signal satisfies a second threshold criterion representing a presence of the object; and
    a second data point where the first filtered signal is less than the second filtered signal after the difference in amplitude satisfies the second threshold criterion, wherein the first data point is a first index of the signal range and the second data point is a last index of the signal range.

* * * * *